United States Patent
Salomon et al.

(10) Patent No.: US 11,032,062 B2
(45) Date of Patent: Jun. 8, 2021

(54) DATA PROCESSING PERMITS SYSTEM WITH KEYS

(71) Applicant: Switchbit, Inc., San Francisco, CA (US)

(72) Inventors: Yacov Salomon, Danville, CA (US); Seth Yates, Danville, CA (US); Maxwell Anderson, San Francisco, CA (US); Vivek Vaidya, San Francisco, CA (US); Anton Winter, San Mateo, CA (US); Samuel Alexander, San Francisco, CA (US); Tom Chavez, San Francisco, CA (US)

(73) Assignee: Switchbit, Inc., San Francisco, CA (US)

(*) Notice: Subject to any disclaimer, the term of this patent is extended or adjusted under 35 U.S.C. 154(b) by 0 days.

(21) Appl. No.: 16/741,666

(22) Filed: Jan. 13, 2020

(65) Prior Publication Data

US 2021/0083843 A1 Mar. 18, 2021

Related U.S. Application Data

(60) Provisional application No. 62/901,648, filed on Sep. 17, 2019.

(51) Int. Cl.
*G06F 21/00* (2013.01)
*H04L 9/06* (2006.01)
*H04L 9/08* (2006.01)
*G06F 21/60* (2013.01)

(52) U.S. Cl.
CPC .......... *H04L 9/0618* (2013.01); *G06F 21/602* (2013.01); *H04L 9/0819* (2013.01)

(58) Field of Classification Search
CPC .... H04L 9/0618; H04L 9/0819; G06F 21/602
See application file for complete search history.

(56) References Cited

U.S. PATENT DOCUMENTS

| | | | |
|---|---|---|---|
| 2005/0262572 A1* | 11/2005 | Yoneyama | G06F 21/6218 726/27 |
| 2008/0092239 A1* | 4/2008 | Sitrick | H04N 21/4627 726/27 |
| 2013/0238900 A1* | 9/2013 | Leggette | G06F 11/1451 713/165 |

(Continued)

*Primary Examiner* — Kendall Dolly
*Assistant Examiner* — Michael M Lee
(74) *Attorney, Agent, or Firm* — Holland & Hart LLP

(57) ABSTRACT

Methods, systems, and devices for data processing are described. Some systems may support data processing permits and cryptographic techniques tying user consent to data handling. By tying user consent to data handling, the systems may comply with data regulations on a technical level and efficiently update to handle changing data regulations and/or regulations across different jurisdictions. For example, the system may maintain a set of data processing permits indicating user consent for the system to use a user's data for particular data processes. The system may encrypt the user's data using a cryptographic key (e.g., a cryptographic nonce) and may encrypt the nonce using permit keys for any permits applicable to that data. In this way, to access a user's data for a data process, the system may first verify that a relevant permit indicates that the user complies with the requested process prior to decrypting the user's data.

20 Claims, 15 Drawing Sheets

(56) References Cited

U.S. PATENT DOCUMENTS

| | | | | |
|---|---|---|---|---|
| 2016/0105409 A1* | 4/2016 | Torman | ............... | H04L 63/20 |
| | | | | 726/6 |
| 2018/0124056 A1* | 5/2018 | Roth | ............... | H04L 63/108 |
| 2018/0349638 A1* | 12/2018 | Barraclough | ......... | H04W 12/02 |
| 2019/0007390 A1* | 1/2019 | Wu | ............... | H04L 9/3242 |
| 2019/0318105 A1* | 10/2019 | Roth | ............... | G06F 21/6227 |
| 2019/0378102 A1* | 12/2019 | Kohli | ............... | G06F 9/547 |
| 2020/0053065 A1* | 2/2020 | Wisniewski | ......... | H04L 9/0822 |

* cited by examiner

DATA PROCESSING PERMITS SYSTEM WITH KEYS

CROSS REFERENCE

The present Application for Patent claims the benefit of U.S. Provisional Patent Application No. 62/901,648 by Salomon et al., entitled "DATA PROCESSING PERMITS SYSTEM WITH KEYS," filed Sep. 17, 2019, assigned to the assignee hereof, and expressly incorporated herein.

FIELD OF TECHNOLOGY

The present disclosure relates generally to data processing, and more specifically to a data processing permits system using keys.

BACKGROUND

Any system, company, or organization that interacts with data may need to follow regulations to correctly handle the data. For example, a system may store or handle data if the system has a legitimate reason to store or handle that data, and otherwise the system may not store the data. These regulations may apply to any personal data, including both "hard" identifiers explicitly indicating a user and "soft" identifiers implicitly indicating a user. Some examples of such regulations may include the European Union's General Data Protection Regulation (GDPR), the Health Insurance Portability and Accountability Act (HIPAA) for health-related data privacy, and the Federal Trade Commission's (FTC's) data and privacy regulations for financial institutions, among other such regulations. Additionally, the regulations for data handling may change based on new laws, new industries, new security concerns, etc., and these regulations may be different for different jurisdictions. As such, a static system for handling data protection is not sufficient for following rapidly changing regulations or managing regulations across multiple jurisdictions. Furthermore, implementing a system that handles user consent separately from data processing may fail to ensure technically that the system uses the data in the proper manner, resulting in a great deal of risk for the organization running the system. That is, simply claiming to follow the rules may not meet the high standards of some data protection regulations, leaving an organization liable or facing prohibitive cost if the system uses any user data incorrectly (e.g., without the proper consent or legitimizing reason). Furthermore, some regulations may require a system to provide, to a user upon request, a vast amount of information about how the user's data is managed. Many systems may have no structures or functionality in place to support receiving such requests, processing such requests, or sending the requested information to the user.

DETAILED DESCRIPTION

Figure 1:
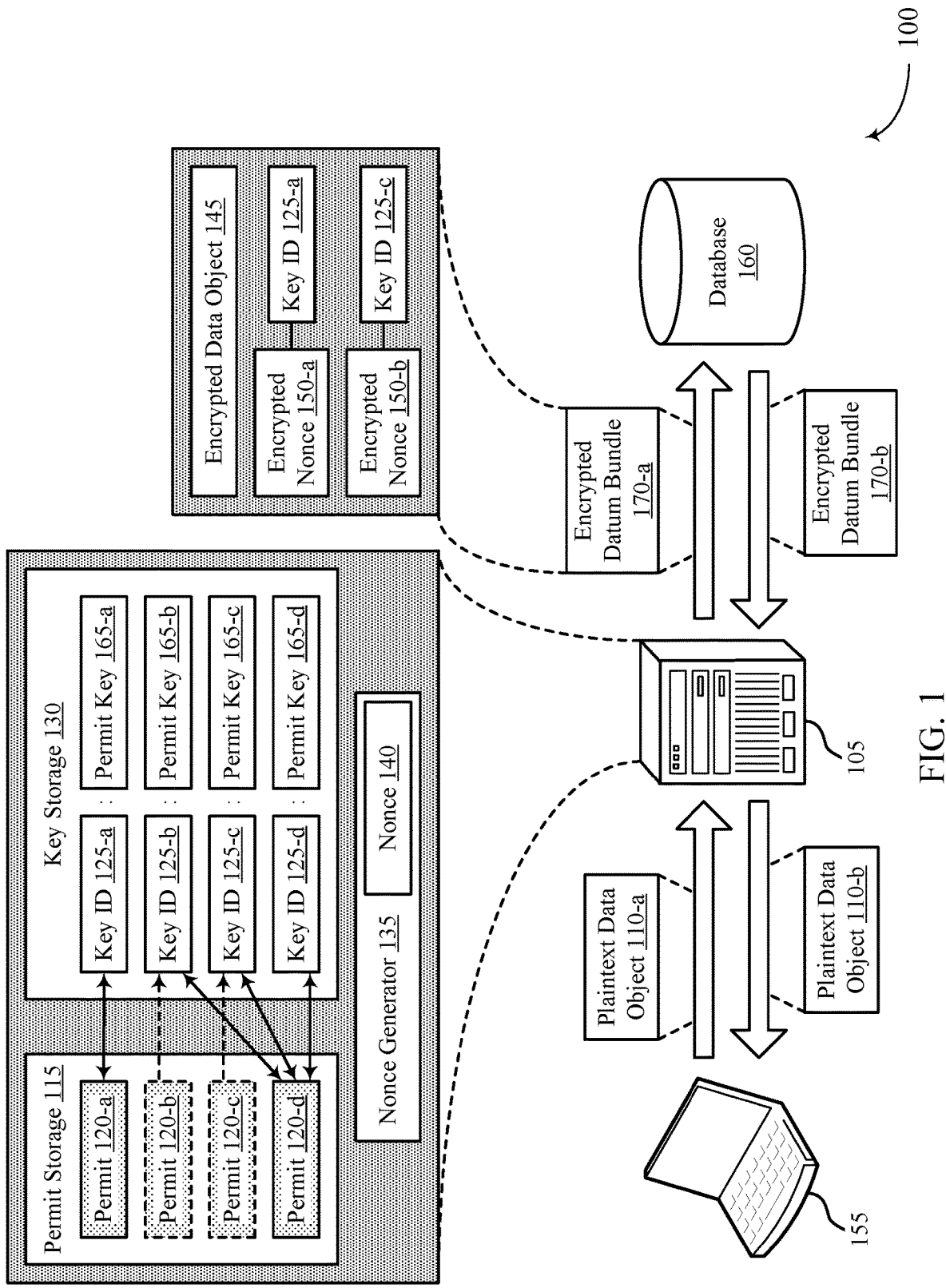
FIGS. 1 and 2 illustrate examples of systems that support data processing permits with keys in accordance with aspects of the present disclosure.

Data regulations may set rules and/or restrictions for how a data management system may collect, store, and process user data. For example, in some cases, a data management system may not store user data without specific consent from the relevant user. Additionally or alternatively, the system may provide information to the user upon request indicating how the user's data is used within the system. The data regulations for a system may change based on new laws, new industries, new security concerns, etc., and may be different across different jurisdictions. To handle these data regulations, the system may implement data processing permits and cryptographic techniques to tie legitimizing reasons for using data (e.g., user consent) to data handling. For example, by tying user consent to data handling at a technical level, the system may automatically comply with data regulations and efficiently update to handle changing data regulations and/or regulations across different jurisdictions.

For example, the system may support a system of record (SOR) for data processing permits. The SOR for data processing permits may manage legitimizing reasons for data use (e.g., user consent information) by generating data processing permits that indicate the legitimizing reason (e.g., a user's consent). If a user consents to the system using the user's personal data for one or more data processing activities, the system may automatically create a permit indicating this consent. The permit may be user-specific and data processing activity-specific. Additionally, the permit may be associated with a permit key (e.g., a key encrypting key or key chain). For example, the permit key may include a pointer to the permit, and the permit may include a key identifier (ID) for the permit key. In some cases, the system may support creating, updating, and revoking data processing permits (e.g., based on user inputs to a consent management user interface (UI)). In some such cases, the permit key's pointer may update to point to a latest relevant permit (e.g., based on a new or updated data processing permit stored in the system).

To tie these permits to data, the system may implement one or more cryptographic techniques. For example, when the system receives data for a user, the system may search for any applicable data processing permits indicating that the system can store the received data (e.g., based on the relevant user's consent or another legitimizing reason for storing the data). If the system can store the data (i.e., the system identified a relevant permit), the system may generate a nonce, such as a cryptographic nonce or data encrypting key, to encrypt the user's data and obtain an encrypted data object. The system may additionally encrypt the nonce using the permit keys for any relevant permits. The system may store the encrypted data object with the encrypted nonces and key IDs of the relevant permit keys (e.g., one or more permit keys pointing to the relevant data processing permits), for example, in an encrypted datum bundle. If the system receives a data processing request requesting to use the user's data, the system may check the corresponding permits. If any of the permits (e.g., the currently active permits) indicate that the user has consented for the system to use the data for the requested data process, the system may use the permit key for the consenting permit (e.g., the permit key pointing to the consenting permit, the permit key pointed to by the consenting permit, etc.) to decrypt the corresponding nonce (e.g., an encrypted cryptographic nonce stored with the encrypted data in the encrypted datum bundle). The system may use this cryptographic nonce to decrypt the data such that the data is accessible for the system (or an external system) to perform the requested data processing activity. In this way, if the system receives a data processing request that is not consented to by the relevant user, the system may fail to identify a corresponding data processing permit and may correspondingly fail to decrypt the data. This may technically ensure that personal data for a user stored in the data management system is used for the data processing activities consented to by the user and is not used for other (non-consented to) activities.

Aspects of the disclosure are initially described in the context of systems supporting data processing permits with keys. Additional aspects of the disclosure are described with reference to systems for data management, encryption, differential privacy, and permit creation. Aspects of the disclosure are further illustrated by and described with reference to process flows, apparatus diagrams, system diagrams, and flowcharts that relate to data processing permits systems with keys.

FIG. 1 illustrates an example of a system 100 that supports data processing permits with keys in accordance with aspects of the present disclosure. The system 100 may include an application server 105 for managing the data processing permits 120, the keys (e.g., data encryption keys, key encryption keys, etc.), or both. The application server 105 may be an example of a database server, a cloud-based server, a server cluster, a virtual machine, a container, or any other device or system supporting data processing. In some cases, a user device 155 (e.g., a personal electronic device such as a cellular phone, a personal digital assistant (PDA), a tablet computer, a laptop computer, a personal computer, a smart device, a sensor, etc.) may interact with the application server 105. The application server 105 may additionally or alternatively communicate with a database 160 (e.g., a single database, a data store, a distributed database, a database system, a data management system, a cloud storage system, etc.), one or more other servers, or a combination thereof. The application server 105 may manage data privacy for the system 100 using data processing permits 120 and keys.

In some other systems, user consent may be handled independent of data processing. For example, these other systems may store user consent information in a database and may implement rules for users of the system to follow the stored consent information. However, such rules may not stop a user from mishandling data, and this mishandling of data may be hidden from the affected user. Furthermore, as data protection regulations change, or data is passed between different jurisdictions with different data protection regulations, such systems may fail to follow the proper data protection regulations. For example, implementing a static system for handling data protection may fail to properly comply with data protection regulations.

In contrast, the system 100 may implement a dynamic system for handling data protection regulations. For example, the system 100 may dynamically allow or restrict access to particular information based on changing regulations, new or revoked user consents, or both. Additionally, using data processing permits 120 (which in some cases may be referred to simply as "permits") with data encryption, the system 100 may ensure technically that the system 100 does not allow users to use data incorrectly. For example, the system 100 may break or fail to access data for a process for which the system 100 does not have a proper legitimizing reason to perform (e.g., if the process is not properly consented to by a user). The application server 105 may additionally or alternatively manage an SOR for the data processing permits 120. By implementing the data processing permits 120, the application server 105 may manage information that reflects all legitimizing reasons for performing data processes and ties these legitimizing reasons (e.g., user consents) into technical implementations within a data management system.

For example, the application server 105 may include data processing permit storage 115. The permit storage 115 may include a set of data processing permits 120, where each data processing permit 120 corresponds to a particular data processing activity, a particular user, a particular policy scope, or a combination of these. When the application server 105 receives personal data for a user, the application server 105 may search the permit storage 115 for any data processing permits 120 applicable to the personal data. If the application server 105 identifies that a data processing permit 120 indicates a proper legitimizing reason (e.g., based on user consent or some other legitimizing reason) for the system 100 to store, manage, and/or analyze the personal data, the system 100 may store the data. Otherwise (e.g., if no data processing permit 120 is applicable to the personal data), the system 100 may not store the personal data. For example, the application server 105 may permanently delete the personal data without passing the personal data onto a database 160 for storage. In this way, the application server 105 may ensure that data is collected under the proper conditions and otherwise is not collected.

The application server 105 may implement encryption techniques to ensure that personal data is used by the proper processes (e.g., data processes consented to by a user) and is not used by other processes. For example, the application server 105 may receive a plaintext data object 110-*a* including personal information for a user. The plaintext data object 110-*a* may be an example of a data record, a set of data records, or user information of any size corresponding to a single user. A user device 155 or some other device may transmit the plaintext data object 110-*a* to a data management system (e.g., for storage, analysis, etc.). The application server 105 may intercept or otherwise receive the plaintext data object 110-*a* to implement data protections. For example, the application server 105 may manage data into and out of the data management system to ensure that the data management system complies with current data protection regulations.

The application server 105 may identify any data processing permits 120 in the permit storage 115 that are applicable to the plaintext data object 110-*a* according to an associated data processing activity and user. For example, the plaintext data object 110-*a* may include personal information for a particular user, and the data processing permit 120-*a* may indicate that the particular user has consented to the system 100 using this personal information for a particular data processing activity. As such, the data processing permit 120-*a* may be applicable to the plaintext data object 110-*a*. In some cases, a second data processing permit 120-*b* may not be applicable to the plaintext data object 110-*a* (e.g., the second data processing permit 120-*b* corresponds to a different user, a different type of data, etc.), while a third data processing permit 120-*c* may also be applicable to the plaintext data object 110-*a* (e.g., the third data processing permit 120-*c* corresponds to a different data processing activity relevant to the plaintext data object 110-*a* and for the same user). As at least one data processing permit 120 is applicable to the plaintext data object 110-*a* and supports storing the plaintext data object 110-*a* in the system 100, the system 100 may store the data object.

To ensure that the plaintext data object 110-*a* is used for the proper data processing activities (e.g., the data processing activities specified in the data processing permits 120-*a* and 120-*c*), the application server 105 may encrypt the plaintext data object 110-*a* using a nonce 140 (e.g., a cryptographic key, such as a data encryption key or cryptographic nonce). In some cases, a nonce generator 135 or key generator at the application server 105 may generate the nonce 140. In some other cases, a key management server or key management system may generate the nonce 140 and may pass the nonce 140 to the application server 105. The application server 105 may obtain an encrypted data object 145 based on the encryption process, where the encrypted data object 145 is a ciphertext data object including the same information as the plaintext data object 110-*a* but encrypted using the nonce 140. It is to be understood that the application server 105 may use any number of encryption techniques to encrypt the data object.

To tie the legitimizing reasons for storing the data (e.g., the user consents) to the encrypted data, the application server 105 may further encrypt the nonce 140 using one or more permit keys 165 to obtain one or more encrypted nonces 150. Each permit key 165 may correspond to a key ID 125. For example, key ID 125-*a* may point to a first permit key 165-*a*, key ID 125-*b* may point to a second permit key 165-*b*, and key ID 125-*c* may point to a third permit key 165-*c*. As described herein, because data processing permits 120-*a* and 120-*c* are applicable to the plaintext data object 110-*a*, the application server 105 may encrypt the nonce 140 using the permit key 165-*a* for key ID 125-*a* corresponding to data processing permit 120-*a* (e.g., resulting in encrypted nonce 150-*a*) and the permit key 165-*c* for key ID 125-*c* corresponding to data processing permit 120-*c* (e.g., resulting in encrypted nonce 150-*b*). The application server 105 may not encrypt the nonce 140 using the permit key 165-*b* for key ID 125-*b* corresponding to data processing permit 120-*b*, as this permit is not applicable to the plaintext data object 110-*a*. In some cases, the application server 105 may store the permit keys 165 with corresponding key IDs 125 in a key storage 130. Additionally or alternatively, the application server 105 may transmit the encrypted data object 145, the corresponding encrypted nonces 150-*a* and 150-*b*, identifiers indicating the permit keys 165-*a* and 165-*c*, such as the key IDs 125-*a* and 125-*c* (e.g., pointing to the identified applicable data processing permits 120-*a* and 120-*c*), or a combination thereof to the database 160 as an encrypted datum bundle 170-*a* for storage. For example, the encrypted nonce 150-*a* may be indexed with key ID 125-*a* and the encrypted nonce 150-*b* may be indexed with key ID 125-*c* in the encrypted datum bundle 170-*a*.

Each key ID 125 may be associated with an active data processing permit 120. For example, key ID 125-*a* may be associated with a single, current (i.e., active) permit per user, processing activity, and policy scope. However, this association may be dynamic, such that a key ID 125 may migrate to a most relevant data processing permit 120 (e.g., a most up-to-date data processing permit 120). For example, a user may update consent information, creating a data processing permit 120-*d* that is an updated version of data processing permit 120-*c*. Accordingly, the application server 105 may migrate the key ID 125-*c* from data processing permit 120-*c* to point to newly active data processing permit 120-*d*. In some cases, changes in data regulations, merging of different privacy rights, changes to how devices are connected, or any combination of these or other events may result in updates to the current version of a data processing permit 120.

Additionally or alternatively, a data processing permit 120 may be associated with multiple key IDs 125, which may be referred to as a "key chain." For example, the system 100 may identify that data processing permit 120-*b* and data processing permit 120-*c* correspond to the same user (when previously the system 100 treated these as permits for separate users). In some cases, the system 100 may create a new data processing permit 120-*d* based on this new understanding of identity, where data processing permit 120-*d* becomes the current permit for both data processing permits 120-*b* and 120-*c*. Both key ID 125-*b* and key ID 125-*c* may be updated to point to this new data processing permit 120-*d*. Furthermore, data processing permit 120-*d* may point to its own key ID 125-*d* (e.g., when a data processing permit 120 is created, the permit 120 may have a unique permit key 165 and a unique key ID 125 created as well), such that the data processing permit 120-*d* points to a key chain. As described herein, the key chain may include keys IDs 125-*b*, 125-*c*, and 125-*d* associated with permit keys 165-*b*, 165-*c*, and 165-*d* for the data processing permit 120-*d*.

Because each permit 120 has a notion of an associated cryptographic key (e.g., a permit key 165), the system 100 may provide a technical guarantee that the data regulations and user consents are followed using the permit keys 165. For example, the application server 105 may lock (e.g., encrypt) all data entering the data management system with a special key associated with a permit 120 (e.g., a nonce 140, that is itself encrypted using one or more permit keys 165 to tie this nonce 140 to one or more particular permits 120). Accordingly, the application server 105 may enforce that the encrypted data may be unlocked and accessed under the proper conditions (e.g., conditions consented to by a user), and otherwise may be kept inaccessible.

For example, if the application server 105 receives a data processing request for data stored at the database 160 (e.g., from a user device 155), the application server 105 may use the permits 120 to check for proper data usage by the data processing request. The application server 105 may ensure that data is used for the proper activities and accessed by the proper authorities (e.g., based on received user consents) according to the data processing permits 120. For example, the application server 105 may identify data processing permits 120 in the permit storage 115 that correspond to the data processing request. In a first example, the application server 105 may identify a permit 120 based on the corresponding data processing activity for the permit 120 applying to the data processing request. In a second example, the application server 105 may identify the encrypted data object 145 or objects requested in the data processing request and may identify a permit 120 based on a permit key ID 125—and the corresponding permit 120 pointed to by the key ID 125 for the permit key 165—associated with the encrypted data object 145 or objects.

The application server 105 may retrieve an encrypted data object 145 (e.g., in an encrypted datum bundle 170-b) from the database 160 based on the received data processing request. In some cases, the application server 105 may locate the encrypted data object 145 in the database 160 based on metadata for the encrypted data object 145 or based on one or more identifiers or lookup indexes for the encrypted data object 145. The application server 105 may additionally retrieve, with the encrypted data object 145, the encrypted nonces 150 and corresponding key IDs 125 associated with the encrypted data object 145. For example, the application server 105 may retrieve encrypted nonce 150-a with the corresponding key ID 125-a and encrypted nonce 150-b with the corresponding key ID 125-c in an encrypted datum bundle 170-b along with the encrypted data object 145 from the database 160.

The application server 105 may additionally identify a data processing permit 120, a permit key 165, or both associated with the encrypted data object 145 and indicating user consent to perform a processing activity specified in the data processing request. For example, data processing permit 120-a may indicate that a user, "User A," has consented to a company, "Company A," using User A's personal residency information for targeted advertisements. As such, if the data processing request is from an authorized user at Company A to analyze data in the database 160 for targeted advertising, the application server 105 may retrieve encrypted data object 145 containing encrypted residency information for User A. The application server 105 may look up key IDs 125-a and 125-c associated with the encrypted nonces 150-a and 150-b and determine the current data processing permits 120 pointed to by these key IDs 125. For example, key ID 125-a may point to data processing permit 120-a and key ID 125-c may point to data processing permit 120-d (e.g., based on an update to data processing permit 120-c). Based on the processing activity specified in the data processing request, the application server 105 may identify that data processing permit 120-a is relevant to the data processing request. Accordingly, the application server 105 may retrieve the permit key 165-a associated with the key ID 125-a pointed to by the data processing permit 120-a and may use this permit key 165-a to decrypt the encrypted nonce 150-a. Using the corresponding decrypted nonce 140, the application server 105 may decrypt the encrypted data object 145 to access the personal residency information for User A (i.e., included in plaintext data object 110-b) and use this information for targeted advertising, as requested (e.g., in the system 100, at the requesting user device 155, in another external system, etc.).

In this way, the personal information is accessed if a data processing permit 120 supports the requested data access. However, if the application server 105 does not include a permit 120 supporting a data processing request, the application server 105 may fail to identify a permit key 165 to decrypt an encrypted nonce 150 for the encrypted data object 145. As such, the application server 105 may not access the proper cryptographic nonce 140 to decrypt the encrypted data object 145. Such a system may ensure that personal information is not accessible for any data processing activities that are not consented to by a user, as reflected in the current set of data processing permits 120 in the permit storage 115. For example, the application server 105 may not store a plaintext version of a cryptographic nonce 140 in memory that can unlock the encrypted data object 145, so the application server 105 may fail to decrypt this encrypted data object 145 if the application server 105 does not identify a relevant data processing permit 120. Accordingly, the system 100 may check for valid permits 120 on encryption and decryption operations both for technical reasons (e.g., to be able to access the unencrypted data) and to ensure that the most up-to-date consumer preferences are respected (e.g., based on the latest user consent information or other legitimizing reasons for accessing data).

The system 100 may support further technical advantages based on tying data processing permits 120 to data using cryptographic techniques. For example, the system 100 may support automatic encryption of all data entering a data management system, improving data securitization and protecting against data breaches. The system 100 may also support extensive auditing activities. For example, the system 100 (e.g., at the applications server 105, the database 160, etc.) may maintain an audit log storing information related to how the data in the system 100 is handled and/or accessed. In this way, the system 100 may keep a track record to show if any issues with data management or hacks occur. For example, the system 100 may be auditable in order to track granular data processing at an individual and/or data processing activity consent level. Such an auditable system may support data regulations and compliance.

Additionally or alternatively, the system 100 may support efficient data deletion using the permit keys 165. To delete data, the application server 105 may delete the corresponding permits keys 165, rather than performing a time and resource intensive search of the database 160 for all corresponding data objects. For example, the application server 105 may receive a delete request for a user's data. This delete request may be an example of a consumer level deletion request, and the delete request may be associated with a maximum time for completing the corresponding deletions (e.g., 45 days). Such a delete request may be extremely taxing for an organization, especially if the organization stores a high volume of data across a distributed database system (e.g., including backup databases). To efficiently handle the delete request (e.g., with a relatively low latency and processing overhead), the application server 105 may identify any data processing permits 120 associated with the requesting user and may delete permit keys 165 for the data requested to be deleted. Alternatively, the application server 105 may identify the permit keys 165 for the requesting user and delete the permit keys 165 for the data requested to be deleted (e.g., independent of the data processing permits 120). By deleting the corresponding permit keys 165 using a permanent deletion procedure, the application server 105 may no longer access the cryptographic nonce 140 for decrypting the corresponding data. For example, the application server 105 may delete permit keys 165-a and 165-c corresponding to key IDs 125-a and 125-c, respectively, used to encrypt the cryptographic nonce 140 for the encrypted data object 145. In this way, while the corresponding data (e.g., the encrypted data object 145) may remain in the database 160, the data is effectively deleted as the unencrypted version of the data is completely inaccessible (e.g., as the key storage 130 no longer stores permit keys 165 that can decrypt the encrypted nonces 150-*a* and 150-*b*). The database 160 may eventually delete the corresponding data during a cleanup or compaction procedure to free up database resources, but these processes may be performed outside the maximum time for performing the data deletions, as the data is already effectively deleted due to the permit key 165 deletion process.

In an example, the application server 105 may receive a delete request for User A's personal information. The application server 105 may refrain from searching the database system for every data object (e.g., row of data, key-value pair, etc.) containing personal information for User A. For example, such a search may entail searching across a large volume of databases, backup databases, disaster recovery databases, database servers, etc. to identify every instance of the data requested for deletion. Instead, the application server 105 may search the permit storage 115 for data processing permits 120 indicating User A's consent for the system 100 to store User A's personal information. As User A no longer consents to this storage of personal information (according to the delete request), the application server 105 may identify each corresponding data processing permit 120 and delete the associated permit key 165 or permit keys 165 (or delete the entire permit 120). For example, the application server 105 may identify that permits 120-*a* and 120-*c* indicate User A's consent for the system 100 to store personal information. The application server 105 may delete the permit keys 165-*a* and 165-*c* corresponding to the key IDs 125-*a* and 125-*c* associated with data processing permits 120-*a* and 120-*c* to satisfy the delete request. Alternatively, the application server 105 may search the key storage 130 for permit keys 165, key IDs 125, or both associated with User A and may delete the permit keys 165. As such, the encrypted nonces 150-*a* and 150-*b* may no longer be decryptable based on deleting the corresponding permit keys 165-*a* and 165-*c*, resulting in cryptographic nonce 140 being permanently inaccessible to the system 100. In this way, the encrypted data object 145 (and any other data objects storing personal information for User A in the database system) can no longer be decrypted, effectively "deleting" the unencrypted version of this data.

It should be appreciated by a person skilled in the art that one or more aspects of the disclosure may be implemented in a system 100 to additionally or alternatively solve other problems than those described above. Furthermore, aspects of the disclosure may provide technical improvements to "conventional" systems or processes as described herein. However, the description and appended drawings only include example technical improvements resulting from implementing aspects of the disclosure, and accordingly do not represent all of the technical improvements provided within the scope of the claims.

In a specific example, the application server 105 may receive an email address (e.g., a "hard" identifier) for a user, along with the user's age, the user's gender, the user's home address, and information related to the user's preference in sports teams (e.g., "soft" identifiers"). The application server 105 may search the permit storage 115 for relevant data processing permits 120 applicable to this received personal information. If the application server 105 identifies one or more data processing permits 120 indicating that the user has consented to the system 100 using the user's personal information for targeting advertisements, the application server 105 may encrypt the received personal information using a cryptographic nonce 140. The application server 105 may encrypt the cryptographic nonce 140 using the applicable permits key(s) 165 and may store the encrypted data object 145, encrypted nonce(s) 150, and corresponding key ID(s) 125 as an encrypted datum bundle 170. If the application server 105 receives a request to analyze the user's data for targeting advertisements, the application server 105 may decrypt the personal information for the requested analysis (e.g., based on the user's consent).

In some cases, the application server 105 may support a finer granularity for consent. For example, the user may consent to the system 100 using the user's email address, age, gender, and preference in sports teams for targeting advertisements, but the user may not consent to the system 100 using the user's home address. In this example, if the user has not consented to the system 100 using the user's home address for any data processing activity, the system 100 may not store the user's home address in any permanent data storage or memory and may encrypt and store the other personal information consented to by the user. Specifically, plaintext data received at the application server 105 may include key-value attribute pairs, where different permits 120 (e.g., corresponding to different processing activities) may support the use of different sets of attributes (e.g., and may not support the use of particular other attributes). At decryption time, the application server 105 may return the allowed attributes for a relevant processing activity according to a data processing permit 120 and may not return the other attributes (e.g., based on which attributes can be decrypted by an encrypted nonce 150 and the corresponding permit key 165, based on rules for returning attributes, etc.).

Figure 2:
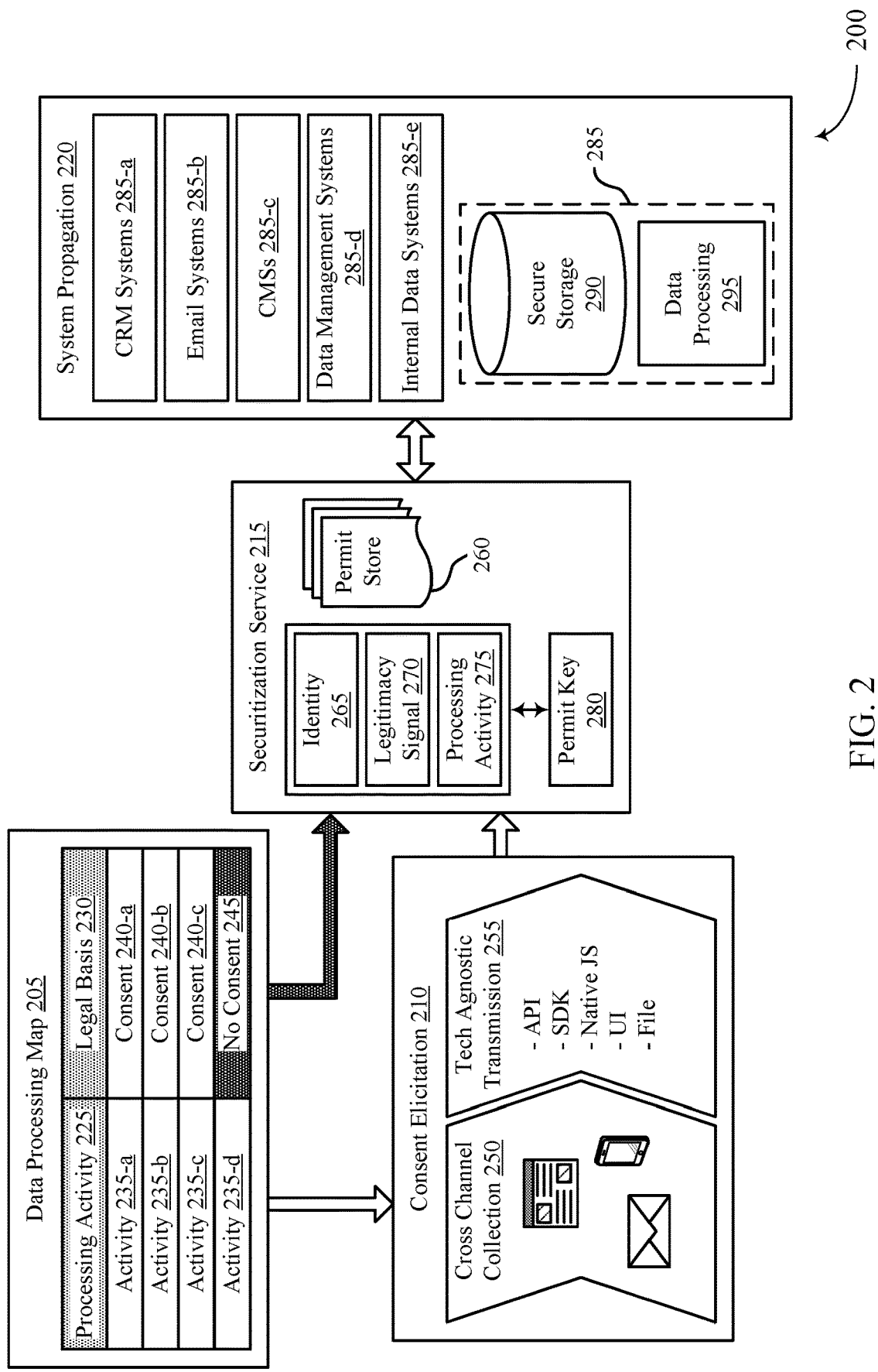

FIG. 2 illustrates an example of a system 200 that supports data processing permits with keys in accordance with aspects of the present disclosure. The system 200 may include a data processing map 205, a consent elicitation process 210, a securitization service 215, and a system propagation process 220. In some cases, a system or server, such as a system 100 or application server 105 as described with reference to FIG. 1, may implement the system 200. The system 200 may support an SOR for permits, cryptography as a means to tie permits to data, or both.

The system 200 may support a data catalog (or "data map"), such as a data processing map 205. The data processing map 205 may indicate what operations the system 200 is performing, what data is included in each operation, what is the justification for each operation, whether a user has given consent for each operation, when the user gave consent, how the user gave consent, to what did the user consent, or any combination of this information. Based on the information in the data processing map 205, the system 200 may determine what the system 200 may do with personal data (e.g., on a user-by-user basis), how to collect the personal data, how long the system 200 may store the personal data, etc. In some cases, the data processing map 205 may include a log for auditing. In some other cases, the system 200 may maintain a separate auditing log. The log may include user consent information, including specific timestamps for when the consent is provided.

The data processing map 205 may include a list of processing activities 225 and a corresponding legal basis 230 for each processing activity 235 of the list of processing activities 225. A processing activity 235 may be an example of an underlying technical process to perform on data, an indication of what a system or organization will do with the data, an indication of the purpose for collecting the data, or some combination thereof. The legal basis 230 for performing a processing activity 235 may be any legitimizing reason for the system 200 to support the processing activity 235, such as a user consenting to the processing activity 235, a regulation specifying that the processing activity 235 is allowed, or some combination of these or other legitimizing reasons. The user's consent 240 for a corresponding processing activity 235 may be part of the legal basis 230. In some cases, the list of processing activities 225 may include activities not currently consented to by one or more users. For example, the data processing map 205 may include processing activity 235-a with the corresponding consent 240-a, processing activity 235-b with the corresponding consent 240-b, processing activity 235-c with the corresponding consent 240-c, and processing activity 235-d with no consent 245. In some cases, the system 200 may not store information for the processing activity 235-d based on the lack of consent. In some other cases (e.g., based on the data regulations for the system 200), the system 200 may store information for the processing activity 235-d even with no consent 245 (e.g., based on some other legitimizing reason for storing the processing activity 235-d). As described herein, the data processing map 205 may support a robust catalog of processing activities 235 and may store indications of whether the system 200 may perform each processing activity 235. These indications may be based on explicit user consents, implicit user consents, regulations for handling particular data records, or a combination thereof (e.g., based on the corresponding processing activity 235, the relevant data regulations, etc.).

In some cases, a user (e.g., an administrative user) may set up the data processing map 205. For example, the system 200 may support a UI in which the user may create the data processing map 205. This UI may be an example of a point-and-click UI, a drag-and-drop UI, or any other type of UI. In some other cases, the system 200 may automatically generate the data processing map 205 based on received user consent information, data regulations, discovery information for a data management system, or some combination thereof. For example, the system 200 may access an organization's data system and may analyze how the data system processes data. Based on the analysis, the system 200 may infer processing activities 235 from the data system's operations and may automatically generate the processing activities 235 for the data system. Additionally or alternatively, the system 200 may process consent information for users with data stored at the data system (e.g., if the data system stores user consent information) and may determine whether the data system has sufficient records to support user consent 240 for each processing activity 235 (e.g., based on current data regulations). Such a discovery process may implement additional techniques to automatically generate a data processing map 205 based on an existing data management system. For example, the discovery process may implement one or more machine learning models, one or more natural language processing (NLP) techniques, supervised or unsupervised discovery, or any combination thereof to generate the data processing map 205.

The system 200 may support a consent elicitation process 210 to receive explicit user consent 240 for one or more processing activities 235. The consent elicitation process 210 may involve cross channel collection 250 of consent information and technology agnostic transmission 255 of the collected consent information to a securitization service 215. For example, the cross channel collection 250 may support collecting user consent from multiple different sources, such as written consent, verbal consent, electronic consent, etc. These sources may be supported by a number of different user device types. The technology agnostic transmission 255 may support receiving and/or transmitting consent information via one or more application programming interfaces (APIs), software development kits (SDKs), native JavaScript (JS) systems, UIs, files, or some combination of these or other similar technologies.

For example, the system 200 may support an application for handling the consent elicitation process 210. In some cases, the application may support different experiences for a user managing data processing for the system 200 and for a user providing consent for the system 200 to process personal information for the user. For example, the application may include an environment for a user (e.g., an enterprise operator) to set up the concept of policies for a data management system, build experiences (e.g., screens) for users to provide consent, define processing activities for the data management system, upload policy documents, activate and/or update versions (e.g., versions of regulations, versions of processing activities, etc.), revise information based on changing regulations, or some combination of these or other functions related to managing data privacy for data processes. The application may further include an environment for a user (e.g., a client of the data management system) to indicate consent for specific processing activities. For example, a consent banner may register consent selections made by a user in a UI. In some cases, each user consent selection may correspond to an underlying "contract" for the system 200 to perform specific functions using the specific personal information for the user. The technology agnostic transmission 255 may support sending the consent information to a processing permits system (e.g., at the securitization service 215 or separate from the securitization service 215, etc.) to handle these contracts.

In some cases, the securitization service 215 may generate permits based on the received contracts. In some other cases, a permit SOR external to the securitization service 215 may operate as a stand-alone permit SOR and may manage the data processing permits. Each permit may record (or at least indicate) parameters of a contract, such as the consenting user, what organization or system may use the indicated data for the user, what processing activity may the organization or system perform on the data, under what conditions may the organization or system perform the processing activity, for how long may the organization or system use the data, how many times or how frequently may the organization or system perform the processing activity, or any combination of these or other relevant parameters. The permits may act as "smart contracts" within the system 200 to enable access to data by permitted systems for permitted processing activities, while denying access to the data by non-permitted systems or for non-permitted processing activities (e.g., as described herein with reference to FIG. 1). The securitization service 215 may include multiple permits for a single user in order to manage multiple data regulations (e.g., data privacy regulations), policy scopes, data processing activities, device identities, or some combination of these features.

The securitization service 215 may implement one or more techniques to tie the permits to individual users (i.e., actual people). For example, the securitization service 215 may maintain a graph including sets of proxy identifiers for individual user "clusters." With inputs to the graph, the securitization service 215 may store, update, and rotate the most accurate (e.g., most recently defined or determined) set of proxy identifiers for each individual user "cluster." These proxy identifiers may indicate which devices, accounts, internet protocol (IP) addresses, etc. correspond to a single user. In some cases, the graph may automatically link consent for a given user across the user's set of proxy identifiers. In some other cases, the system 200 may request for a user to verify a proxy identifier in order to link consent across the proxy identifiers. In yet other cases, the system 200 may maintain separate consent information for each proxy identifier (e.g., even for proxy identifiers linked to the same user). A user may also specify a specific device that may act as the official proxy for the user (e.g., a specific email address, a specific user device, etc.). The system 200 may support providing data privacy information about the user upon request to this specific device.

The securitization service 215 (e.g., a data de-risking service) may implement cryptography to tie the generated permits to the corresponding data such that the user's consent travels with the user's data. That is, the system 200 may store the data for a user such that the system 200 cannot access the data without first looking up the proper user consent permitting access to that data. These user consents may be indicated by the individual permits maintained in the permit store 260. Each permit may include an identity 265 (e.g., a permit identifier, a user identifier, or both), a legitimacy signal 270 (e.g., indicating a legitimizing reason for storing data), an associated processing activity 275 (e.g., that a system may perform on the data according to the legitimizing reason), or any combination of these features. Additionally, a permit key 280 (e.g., a key chain) may point to the permit, the permit may point to one or more associated permit keys 280 (e.g., based on a stored indicator, a lookup relationship, a parent-child relationship, or the like), or both. The securitization service 215 may use one or more of the features of the permits to identify a permit applicable to data entering the system 200 or requested for processing. For example, the identity 265, the legitimacy signal 270, the processing activity 275, or a combination thereof may indicate when a permit is applicable to data, and the permit key 280—which may be referred to as a secret, a permit secret, a key encryption key, or the like—may support cryptography as a means to tie the permit to the data.

The securitization service 215 may support a system propagation process 220. For example, the securitization service 215 may support secure storage and access for user data across a number of systems 285, including customer relationship management (CRM) systems 285-a, email systems 285-b, content management systems (CMSs) 285-c, data management systems 285-d, internal data systems 285-e, or any combination of these or other relevant systems. The securitization service 215 may maintain access to keys (e.g., permit keys 280) internally and may support data and key management across systems or internal to each system. For example, in some cases, the securitization service 215 may pass data between the systems 285 in its encrypted form based on automatic data encryption tied to the permits (e.g., based on each of the systems 285 utilizing the securitization service 215). In some other cases, the securitization service 215 may store data at rest in its encrypted form within a system 285 (e.g., based on the system 285 utilizing the securitization service 215) and may decrypt the data to pass the data as plaintext to one or more other systems 285. For example, the securitization service 215 may support secure storage 290 of data using cryptographic keys (e.g., cryptographic nonces) and the permit keys 280, as described with reference to FIG. 1. The securitization service 215 may additionally support data processing 295 according to user consent. The secure data handling including secure storage 290 and data processing 295 may be maintained at any type of system 285 (e.g., a customer system). These systems 285 may transmit encrypted data to the securitization service 215 for decryption using the managed permits.

Figure 3:
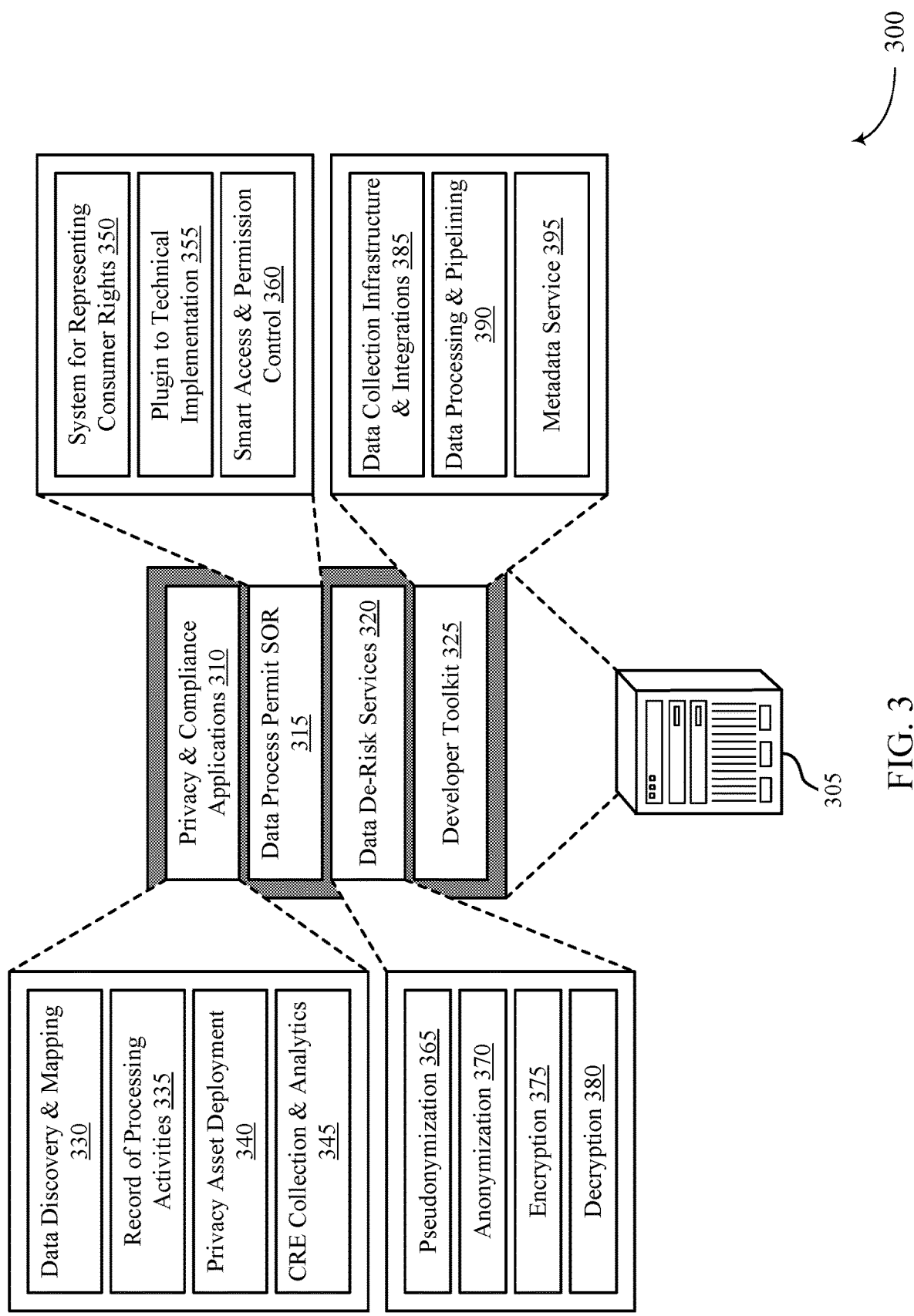
FIG. 3 illustrates an example of a data handling framework that supports a data processing permits system with keys in accordance with aspects of the present disclosure.

FIG. 3 illustrates an example of a data handling framework 300 that supports a data processing permits system with keys in accordance with aspects of the present disclosure. The data handling framework 300 may be implemented at an application server 305 or across a system of processing devices (e.g., servers, database systems, etc.). The data handling framework 300 may support an SOR for data processing permits, cryptography as a means to tie permits to data, or both. For example, the data handling framework 300 may provide privacy-by-design (PbD) technology to improve data management across different systems, users, and roles. The data handling framework 300 may minimize or reduce the impact of data regulations on data-dependent business operations for business owners, effectively reducing the cost of data compliance while retaining valuable data access. Additionally or alternatively, the data handling framework 300 may support retaining a high-level of regulatory compliance for privacy counsel while providing seamless integrations for privacy tools into current data workflows for developers and information technology (IT) leaders. In some cases, the data handling framework 300 may include privacy and compliance applications 310, a data process permit SOR 315, data de-risk services 320, a developer toolkit 325, or some combination thereof.

The privacy and compliance applications 310 may include applications supporting consumer rights management, data flow mapping, regulator audits, or some combination thereof. For example, the privacy and compliance applications 310 may support data processing permits and consent management (e.g., as described with reference to a consent elicitation process 210, a securitization service 215, or both). Additionally or alternatively, the privacy and compliance applications 310 may support data discovery and flow mapping (e.g., as described with reference to a data processing map 205).

In a specific example, the privacy and compliance applications 310 may include data discovery and mapping 330, a record of processing activities 335, privacy asset deployment 340, consumer rights expressions (CRE) collection and analytics 345, or some combination of these or other applications. The data discovery and mapping 330 may leverage automatic and/or manual discovery of data assets and technical operations. In some examples, the data discovery and mapping 330 may apply comprehensive metadata to data attributes and may assign permissions and data owners to data sets and technical operators. The record of processing activities 335 may define the data processing activities supported by the data handling framework 300 (e.g., according to data regulations, such as Article 30 requirements of the general data protection regulation (GDPR)). In some examples, the record of processing activities 335 may map legal bases for relevant policy regimes and may define post functions for internal and/or external systems. The privacy asset deployment 340 may support the design of policy regime-specific privacy experiences, including consent and disclosure notices, privacy policies, a preferences and subject rights portal, etc. The privacy asset deployment 340 may additionally support customizable triggers for experience deployment (e.g., UI experiences for administrative users, external users, etc.). The CRE collection and analytics 345 may support automated processing permit management, audit logs and/or internal analytics for CREs, flexible identities and/or propagation, or a combination thereof.

The data process permit SOR 315 may be an example of a holistic data processing permit SOR for data processing legitimacy and ecosystem connectivity. The data process permit SOR 315 may provide a canonical representation of consumer rights, for example, by implementing a system for representing consumer rights 350. This system may collect, process, and store data (e.g., consumer level data) according to the permits. In some cases, by using the permits to manage data handling, the system may improve internal efficiencies, external efficiencies, or both when securely collecting, processing, and storing the data (e.g., according to user consents). The data process permit SOR 315 may additionally support the propagation of signals internally and/or by operating as middleware in a data management industry. In some cases, the data process permit SOR 315 (or components of the data process permit SOR 315) may plugin to a technical implementation 355 to track, modify, and/or manage the underlying data, data processes, or both. Accordingly, the data process permit SOR 315 may operate in a central role managing both user consents and the technical implementations of data processing. The data process permit SOR 315 may additionally or alternatively support smart access and permission control 360, where a user may manage the status of permits, the creation of permits, the modification of permits, the deletion of permits, or any other permit-related activities.

The data de-risk services 320 may provide solutions for differential privacy, pseudonymization 365, anonymization 370, encryption 375 (e.g., including re-encryption, key rotation, etc.), decryption 380, or some combination of these processes. The developer toolkit 325 may provide technical tools for data management practitioners to integrate consumer expressions with technical implementations. For example, the developer toolkit 325 may support data collection infrastructure and integrations 385, data processing and pipelining 390, a metadata service 395, or some combination of these or other tools for managing data handling.

Based on the combination of features supported by the data handling framework 300, a data management system may provide a number of features for efficiently and securely managing users' private data (e.g., according to regulatory standards). For example, the data handling framework 300 may support a record of processing activities (ROPA) and data flow mapping, where the ROPA may be consolidated with data assets, technical operations, or both. In some examples, the data handling framework 300 may provide consent and data rights management by technically guaranteeing consumer (i.e., user) control for consent and disclosure-based processing of data (e.g., using opt-in/opt-out methods). Additionally or alternatively, the data handling framework 300 may support automated data deletion and portability (e.g., implementing developer-free, real-time or pseudo-real-time, inexpensive completion of data deletion and portability requests in compliance with one or more data regulations). In some examples, the data handling framework 300 may support security of processing. For example, the data handling framework 300 may address the securitization of data (e.g., according to one or more data regulations) using encryption and decryption techniques. In some examples, the data handling framework 300 may support data anonymization by creating anonymous data sets for internal analysis, external research, or both. Additionally or alternatively, the data handling framework 300 may implement regulator transparency by providing regulators with immutable records of all data processing events across an organization or system (e.g., through audit logging). In some cases, the data handling framework 300 may support any number of these or other features to securely manage data according to one or more data regulations and/or to handle changing data regulations.

Figure 4:
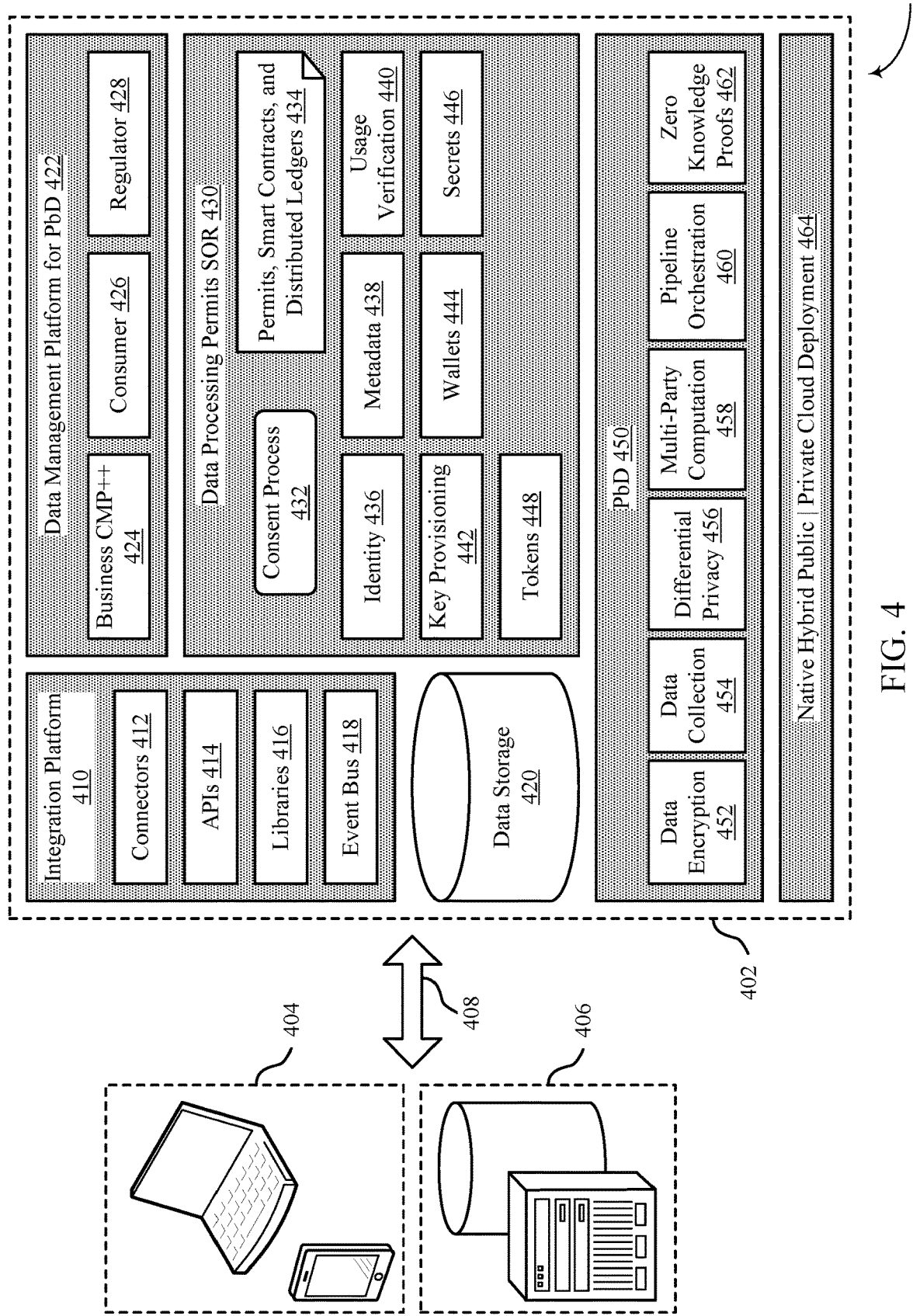
FIG. 4 illustrates an example of a data management system that supports data processing permits with keys in accordance with aspects of the present disclosure.

FIG. 4 illustrates an example of a data management system 400 that supports data processing permits with keys in accordance with aspects of the present disclosure. The data management system 400 may be an aspect of a system 100 or 200 as described with reference to FIGS. 1 and 2. The data management system 400 may support a data handling framework 300 as described with reference to FIG. 3. In some cases, the data management system 400 may be implemented by one or more network devices, such as servers, databases, or the like. The data management system 400 may support PbD by leveraging distributed and decentralized computing in conjunction with modern data storage and processing techniques.

The data management system 400 may include a data management platform 422 (e.g., for PbD), an integration platform 410 (e.g., for interacting with users, user devices, external databases, external systems, organizations, applications, etc.), a data processing permits SOR 430, data storage 420 (e.g., databases, data stores, cloud-based data storage systems, etc.), PbD features 450, deployment solutions 464, or some combination thereof. The data management platform 422 may include a cloud management platform (CMP) and may implement PbD to support business usage, consumer usage, and regulator usage. For example, the data management platform 422 may include a business CMP 424, a consumer 426, a regulator 428, or some combination thereof. The integration platform 410 may include one or more connectors 412, APIs 414, libraries 416, event buses 418, or any combination of these or other integration components to allow for secure and seamless interactions with external systems 406 and/or user devices 404. For example, the integration platform 410 may support communications 408 between the database system 402 and external user devices 404, external systems 406, or both.

The data processing permits SOR 430 may include storage for permits, smart contracts, distributed ledgers, or a combination thereof 434. The data processing permits SOR 430 may manage identity 436, metadata 438, usage verification 440, key provisioning 442, wallets 444, secrets 446, tokens 448, or any combination of these for managing data processing permits. The data processing permits SOR 430 may technically tie the data processing permits (and corresponding user consents via a consent process 432) to user data (e.g., by implementing PbD features 450). In some cases, the PbD features 450 may include data encryption 452, data collection 454, differential privacy 456, multi-party computation 458, pipeline orchestration 460, zero knowledge proofs 462, or some combination of these or other processes implementing PbD.

The data storage 420 may be performed at the data management system 400 or offloaded to another system (e.g., another data management system). The data storage 420 may store personal information for users, where the personal information is encrypted at rest (e.g., based on the data processing permits SOR 430 and the PbD features 450). The deployment solutions 464 may support native hybrid public/private cloud deployment for the data management system 400.

In some cases, the data management system 400 may leverage cryptography to explicitly link consent to how data is captured, stored, and processed. For example, the data management system 400 may support explicit user consent, privacy policies, terms of service, or some combination of these to collect legitimizing reasons for handling user data.

Using data processing permits, the data management system 400 may bind these signals to the technology and processes that interact with the data in order to comply with an ever-changing regulatory landscape. For example, such a binding may support efficient handling of user requested data deletions (e.g., in compliance with regulatory standards). The data management system 400 may protect against user identification based on the personal identifiable information (PII) aspects of user data (e.g., by implementing tokenization). Additionally or alternatively, the data management system 400 may protect against user re-identification using the soft identify aspects of user data (e.g., by implementing one or more differential privacy techniques at read time or at write time). For example, with sufficient noise, differential privacy may reduce the likelihood of user identity leakage by masking the individual-level attributes while preserving enough information (e.g., at an aggregate level) to power insights, analytics, and/or decision making. Accordingly, the differential privacy techniques may involve injecting noise at the individual record level while supporting a means to aggregate data by any given function (e.g., of a set of supported functions), such that user identity is not leaked but the results are of a sufficient statistical power to support analytics. In some examples, the data management system 400 may inject noise into data records (e.g., perform noisification) during a retrieval process for data analysis. For example, when reading data from data storage 420, the data management system 400 may decrypt the data and add noise to the data before sending the data to an external user device 404, an external system 406, or both for processing.

Specifically, the data management system 400 may link stored data, and any interactions with this data, back to the legitimizing signals while preventing user re-identification (e.g., from either hard identities or soft identities). For example, tying data processing activities in a database to the legitimizing reasons may involve managing authorization (e.g., permissioned access based on the permits and/or policy) and removing all access indefinitely if a relevant data deletion request is received at the data management system 400. Additionally, or alternatively, the data management system 400 may support granular consent (e.g., based on privacy policies, among other examples) in order to manage access to personal data at a consented use case-level, securitization to prevent personal data leakage (e.g., in cases of data breach or data sharing), permission and access management to manage granular access to data, or some combination of these or other data management features.

The data management system 400 may include multiple features, components, data stores, experiences, or some combination thereof to support a number of processes for data management. In a first example, the data management system 400 may support identity 436 using identity spaces, an identity API, identity tags, or a combination thereof. This may involve match tables, match files, or the like. For example, the data management system 400 may include an identity administrator UI (e.g., using React), an identity JavaScript SDK, one or more additional identity SDKs (e.g., using Go, Java, Python, .NET, etc.), an identity API (e.g., using Go), an identity and propagation rules storage (e.g., using Dynamo), or some combination thereof.

In a second example, the data management system 400 may support consent (e.g., in a consent process 432), including consent requests, consent configurations, permit management, etc., using mobile SDKs, consent propagation, backend integrations, or some combination of these or additional techniques. For example, the data management system 400 may include a consent JavaScript SDK, a consent mobile operating system SDK (e.g., using Swift, Java, etc.), a policy administrator UI (e.g., using ReactJS) a consent API (e.g., using Go), a policy API (e.g., using Go), a consent permit storage (e.g., using Hyperledger, Postgres, Dynamo, Vault, etc.), a policy storage (e.g., using Postgres, Dynamo, etc.), a consent state dispatcher (e.g., using Go), a consent web hook API specification (e.g., using Swagger), or some combination thereof.

In a third example, the data management system 400 may support securitization (e.g., including one or more PbD features 450) using an encrypt API, a decrypt API, a tokenization API, or some combination of these or other APIs. The securitization may involve a key/data stager job, a streaming staging job, a mobile SDK, a JavaScript SDK, or any combination of these or other jobs and/or SDKs. For example, the data management system 400 may include a securitization configuration UI (e.g., using React), a key/data staging job (e.g., using Java, Hadoop, etc.), a database securitization process, a producer/consumer streaming processor (e.g., using Java, Scala, etc.), a securitization SDK (e.g., using Go, Java, Python, .Net, etc.), an encrypt API Service, a decrypt API service, a tokenization API service, a differential privacy API service, a data awareness API (e.g., where any of the APIs/API services may use Go), a consent permit store (e.g., using Hyperledger, Postgres, Dynamo, Vault, etc.), a tokenization store (e.g., using Dynamo, Postgres, etc.), a data awareness store (e.g., using Postgres), or some combination thereof.

In a fourth example, the data management system 400 may support data awareness and discovery. The data management system 400 may support a data mapping canvas, a data awareness API, automated discovery tools, or any combination of these or other systems for data awareness and discovery. For example, the data management system 400 may include a data awareness administrator UI (e.g., using ReactJS), one or more cloud computing service discoverers, a data awareness API (e.g., using Go), a data awareness store (e.g., using Postgres), or some combination thereof.

In a fifth example, the data management system 400 may support data deletion, including data deletion requests, data deletion queues, data deletion web hooks, etc. For example, the data management system 400 may include a data deletion request consumer UI (e.g., using ReactJS), a data deletion administrator UI (e.g., using ReactJS), a data deletion web hook API specification (e.g., using Swagger), a data deletion API (e.g., using Go), a data deletion dispatch service (e.g., using Go), a data deletion store (e.g., using Postgres), a data awareness store (e.g., using Postgres), or some combination thereof.

In a sixth example, the data management system 400 may support data portability, including data portability requests, data portability queues, data portability web hooks, a data portability inbox, etc. For example, the data management system 400 may include a data portability request consumer UI (e.g., using ReactJS), a data portability administrator UI (e.g., using ReactJS), a data portability inbox consumer UI (e.g., using ReactJS), a data portability web hook API (e.g., using Swagger), a data portability API (e.g., using Go), a data portability inbox API (e.g., using Go), a data portability dispatcher (e.g., using Go), a data portability store (e.g., using Go), a data awareness store (e.g., using Postgres), or some combination thereof.

In a seventh example, the data management system 400 may support differential privacy 456. In some cases, the data management system 400 may support a differential privacy API, a differential privacy UI, a differential privacy database, etc. For example, the data management system 400 may include a differential privacy UI (e.g., using ReactJS), a database differential privacy query API (e.g., using Go), a machine-learned differential privacy API (e.g., using Go), or some combination thereof.

In an eight example, the data management system 400 may support auditing and reporting, including auditing and reporting APIs, UIs, or both. The UIs may track populations, individual users, or some combination of these or other granularities for information tracking. For example, the data management system 400 may include an audit and reporting UI (e.g., using ReactJS), an audit API (e.g., using Go), a reporting API (e.g., using Go), audit storage (e.g., using Hyperledger, Postgres, etc.), or some combination thereof. The data management system 400 may support any combination of these examples or other examples of features for secure data management.

Figure 5:
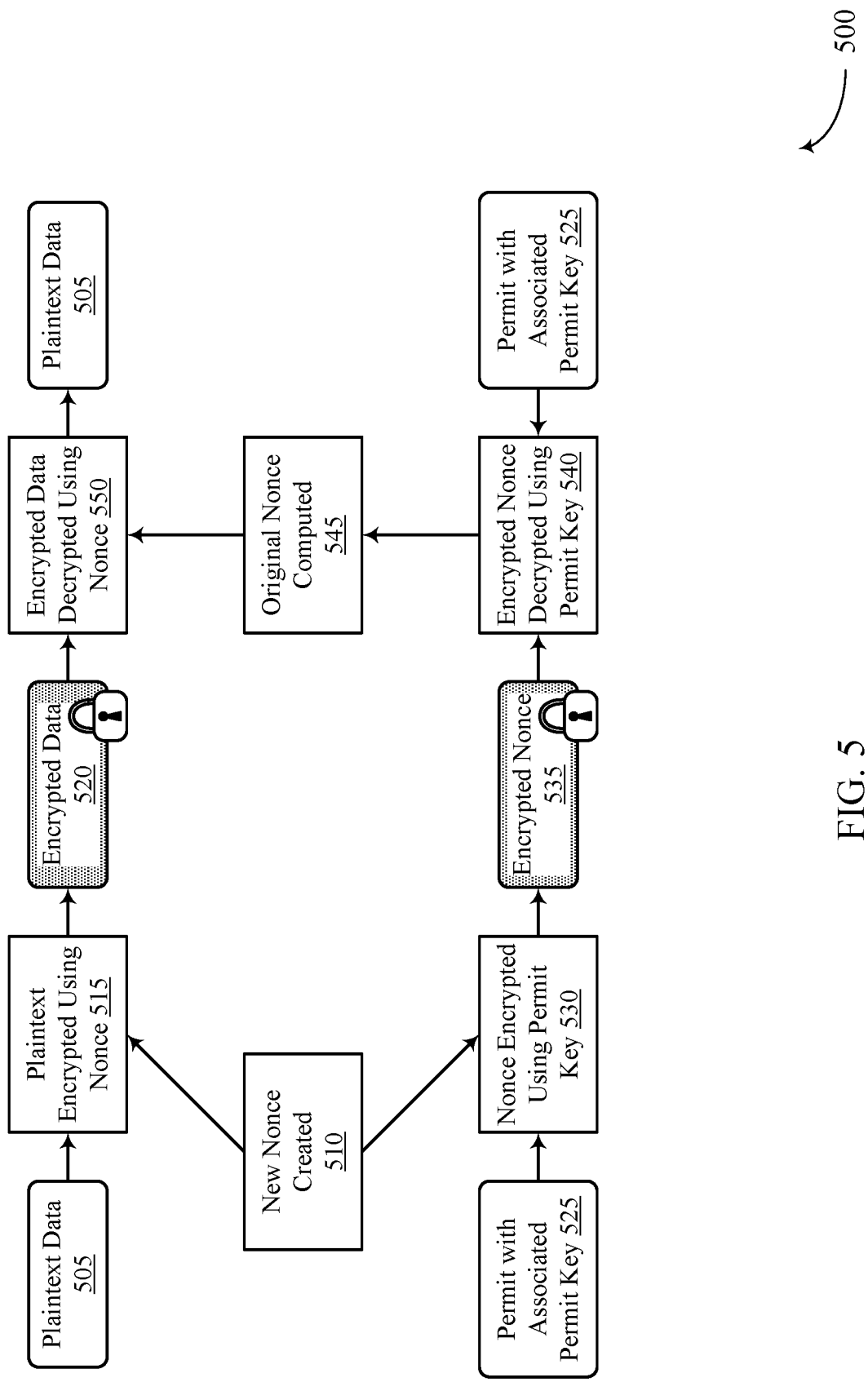
FIG. 5 illustrates an example of an encryption system that supports data processing permits with keys in accordance with aspects of the present disclosure.

FIG. 5 illustrates an example of an encryption system 500 that supports data processing permits with keys in accordance with aspects of the present disclosure. The encryption system 500 may be implemented in a system 100, a system 200, a data handling framework 300, or a data management system 400 as described with reference to FIGS. 1 through 4. For example, an application server (e.g., a database server, a cloud-based server, a server cluster, a virtual machine, a securitization service, etc.) may manage the encryption system 500. The encryption system 500 may implement cryptography to tie user consent to data handling in a technical manner. For example, using fine-grained encryption coupled with smart key management, the encryption system 500 may support security and flexibility for managing data with data processing permits.

For encryption, the encryption system 500 may receive plaintext data 505. The plaintext data 505 may include personal information for a user, including "hard" identifiers, "soft" identifiers, or both. In some cases, the plaintext data 505 may be an example of a plaintext blob containing a set of key-value pairs. The plaintext blob may have an associated identity (e.g., a user identity) and use case information (e.g., a data processing activity, a data flow use case, etc.).

The encryption system 500 may create a new cryptographic nonce (e.g., a data encrypting key) at 510 to encrypt the plaintext data 505. In some cases, the encryption system 500 may use this new nonce as a one-time data encryption key for encrypting the plaintext data 505. The encryption system 500 (e.g., a key management server or system) may generate the nonce based on any number of cryptographic key generation techniques. At 515, the encryption system 500 may encrypt the plaintext data 505 using the nonce to obtain encrypted data 520 (e.g., ciphertext, such as a ciphertext blob).

At 530, the encryption system 500 may encrypt the cryptographic nonce using a permit key (e.g., a secret or key encryption key associated with a data processing permit). For example, the encryption system 500 may identify any permits applicable to the plaintext data 505 (e.g., based on a user, a data processing activity, or a combination thereof), where each of these permits 525 is associated with a permit key. For each applicable permit, the encryption system 500 may encrypt the nonce using the associated permit key at 530 to obtain an encrypted nonce 535 (e.g., an encrypted key). In this way, based on a set of applicable permits, the encryption system 500 may determine a set of encrypted nonces 535, which may be referred to as cipher-nonces. The encryption system 500 may store a set of cipher-nonces corresponding to a set of applicable permit keys (i.e., permit secrets) for the data processing permits that all apply to the same plaintext data 505. The encryption process for the input plaintext data 505 may return the encrypted data 520 (i.e., encrypted ciphertext) and encrypted nonces 535 based on the corresponding permits. Additionally or alternatively, the encryption process may return a list of permit keys (e.g., permits secrets) indicating the data processing permits corresponding to the encrypted data 520 (and the encrypted nonces 535). A database system may securely store the encrypted data 520 with the encrypted nonces 535 or with a pointer to the encrypted nonces 535 and with the list of permit keys or with a pointer to the corresponding permit keys (e.g., using key IDs for the corresponding permit keys). The database system may not store the new cryptographic nonce created at 510 in any unencrypted form (e.g., for security reasons).

In some cases, the permit keys (e.g., the permit secrets) may migrate between data processing permits. For example, as new data processing permits are created or as data processing permits are updated, a relevant permit key may migrate to point to a most up-to-date version of a permit. When the database system receives a request to access data, the system may check the most up-to-date version of the permit for permission to access the data (e.g., based on the permit key or permit key ID pointing to the most up-to-date version of the permit). If the database system determines that the current permit (i.e., the most up-to-date version of the permit) supports the request to access the data, the system may retrieve the permit key pointing to the current permit (where this permit key may have been created for the current permit or originally pointed at a different permit) and use the retrieved permit key in a data decryption process. In this way, the system may update permits (e.g., as data regulations change, users update their consent information, etc.) without re-encrypting data or nonces. Additionally or alternatively, the database system may update permit key pointers based on changes to identity understanding. For example, the system may initially collect consent information—and, correspondingly, data processing permits—separately for a first device and a second device. However, based on new information about the devices, the system may determine that the first device and the second device correspond to a same user. According to this new identity understanding, the database system may aggregate the permits for the two devices to determine the most up-to-date permits for the user and may migrate the permit keys for the two devices to point to the most up-to-date permits for the user.

For decryption, the encryption system 500 may receive encrypted data 520 (e.g., based on a data access request, a data processing request, etc.). The encryption system 500 may additionally retrieve the encrypted nonces 535 for the encrypted data 520 (e.g., a ciphertext blob) and may identify the permit keys (e.g., secrets) associated with the encrypted nonces 535, for example, based on key IDs for these permit keys that are stored with the corresponding encrypted nonces 535. The permit keys may point to associated permits. The encryption system 500 may access the indicated permits and may determine if any of the indicated permits provide user consent to perform the requested data processing. If the encryption system 500 identifies a permit 525 associated with a permit key that supports accessing the encrypted data 520 (e.g., based on user consent), the encryption system 500 may decrypt the encrypted nonce 535 using the permit key (e.g., a secret) for the corresponding permit at 540. Based on this cryptographic nonce decryption, the encryption system 500 may compute the original nonce at 545. For example, the encryption system 500 may re-identify the cryptographic nonce used in the encryption process based on decrypting a cipher-nonce. The encryption system 500 may then use this computed nonce to decrypt the encrypted data 520 at 550. The encryption system 500 may return the decrypted data (i.e., the plaintext data 505) and associated identity information (e.g., user identity information) as a result of the decryption process.

In some examples, the encryption system 500 may include API endpoints supporting encryption use cases, decryption use cases, or both for on-the-fly data handling. In some cases, the API endpoints may be reached directly or via a securitization SDK. Additionally or alternatively, the encryption system 500 may support encryption and/or decryption processes using scheduled jobs, such as data staging, data unstaging, key staging, key unstaging, or some combination thereof. A scheduled job may be an example of a service, a container, a processing job, etc. Data staging may involve the encryption system 500 decrypting data ahead of data processing, while data unstaging may involve the encryption system 500 re-encrypting data after the data processing is complete. The encryption system 500 may perform the data staging/unstaging using stored procedures, materialized views, or both. Key staging may involve the encryption system 500 decrypting a key (e.g., a cryptographic key, cryptographic nonce, etc.) using a permit key ahead of data decryption, while key unstaging may involve the encryption system 500 re-encrypting the key (e.g., cryptographic nonce) using the permit key after the data processing is complete (e.g., after the data decryption is complete, after data re-encryption is complete, etc.). In some examples, a streaming processor may offer end points (e.g., for a user, consumer, producer, organization, etc.) for integration of encryption, decryption, or both in a streaming data processing flow. In some cases, a proxy server (e.g., a HyperText transfer protocol (HTTP) proxy) may support encryption upon data collection on either a client-side or server-side. In some other cases, a client SDK (e.g., a JavaScript SDK) may support encryption upon data collection.

The encryption system 500 may implement particular devices, systems, or processes to support different optimizations. For example, the encryption system 500 may optimize implementation costs, security costs, performance costs, or a combination thereof when handling cryptography for data (e.g., as described in more detail with reference to FIG. 7). These optimizations may involve the encryption system 500 implementing or selecting on-the-fly data management, data staging/unstaging, key staging/unstaging, consumer/producer streaming, data management using an HTTP proxy, data management using a JavaScript SDK, or a combination thereof for particular encryption processes (e.g., encryption, decryption, re-encryption, etc.). For example, the encryption system 500 may use the same or different techniques for form post encryption, HTTP service encryption, file encryption, batch decryption, streaming decryption, database decryption, batch re-encryption, streaming re-encryption, or any combination of these or other encryption processes.

Figure 6:
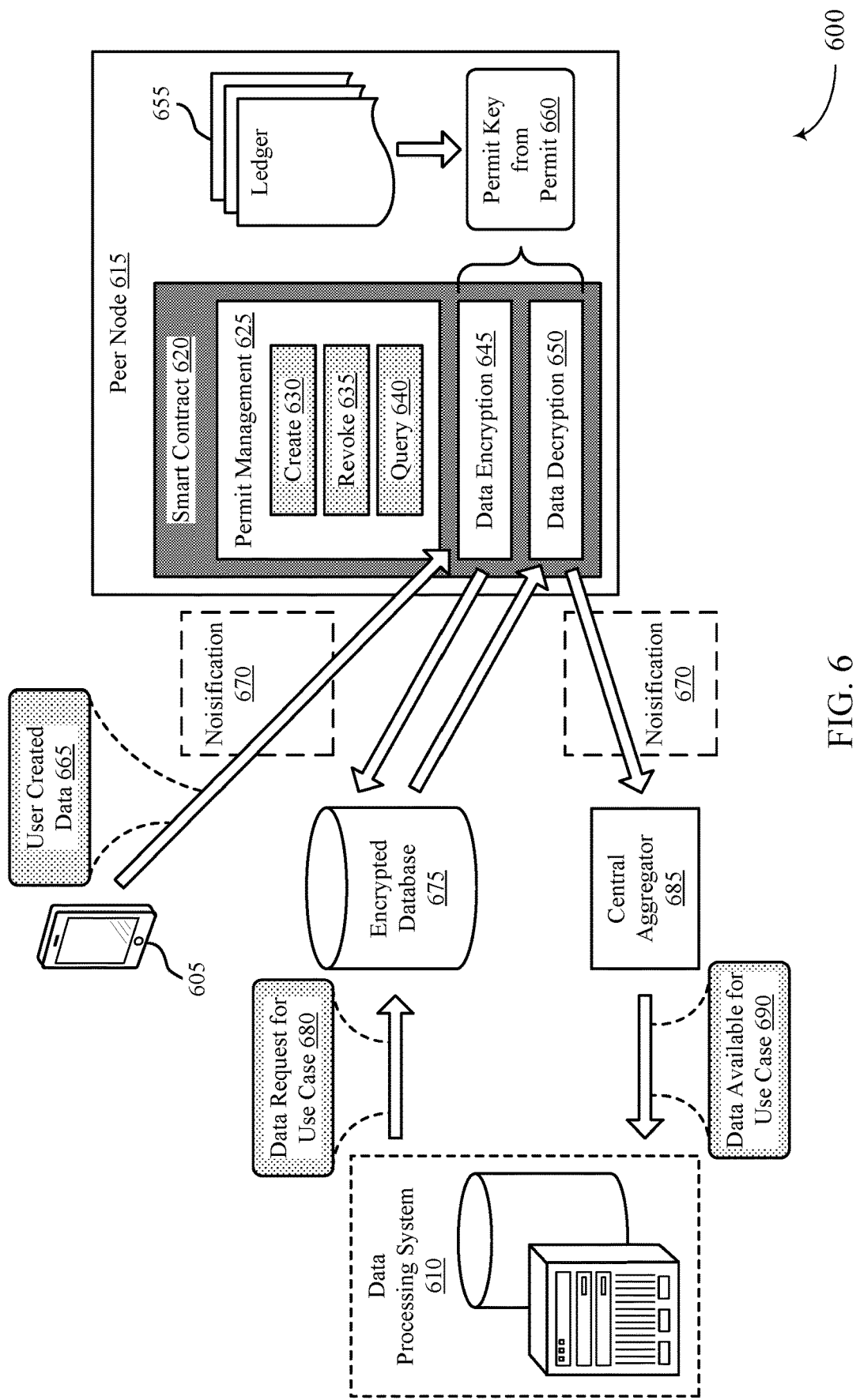
FIG. 6 illustrates an example of a differential privacy management system that supports data processing permits with keys in accordance with aspects of the present disclosure.

FIG. 6 illustrates an example of a differential privacy management system 600 that supports data processing permits with keys in accordance with aspects of the present disclosure. The differential privacy management system 600 may be an aspect of a system 100 or 200 as described with reference to FIGS. 1 and 2. The differential privacy management system 600 may support a data handling framework 300 as described with reference to FIG. 3. In some cases, the differential privacy management system 600 may implement or be a component of a data management system 400 or an encryption system 500 as described with reference to FIGS. 4 and 5. The differential privacy management system 600 may support PbD by leveraging differential privacy techniques (e.g., for further user protections).

A user may send user-specific data (e.g., personal information corresponding to the user) to a data management system via a user device 605. For example, the user may create data 665 (e.g., enter the data 665 into a form or other UI) and select to send the data 665 to the data management system. In some cases, this data 665 may include hard identities, soft identities, or a combination thereof for the user. A hard identity may uniquely identify the user while a soft identity may be an aspect or characteristic associated with the user. While a soft identity by itself may not uniquely identify the user, a set of soft identities (e.g., fifteen or more soft identities) may uniquely identify the user. Accordingly, to protect a user's identity, the differential privacy management system 600 may protect against both any hard identities leaking and too many (e.g., above a threshold number, such as fifteen) soft identities leaking. Hard identities may include social security numbers, names, and email addresses, among other examples. Soft identities may include website visits, purchases, and user preferences, among other examples.

To protect against hard identities leaking, the differential privacy management system 600 may implement tokenization (or other techniques supporting security for hard identities). Tokenization may involve obscuring a hard identity by setting the value for the hard identity to a semi-random token. To protect against a threshold number of soft identities leaking, the differential privacy management system 600 may implement one or more differential privacy techniques. In one specific example, the differential privacy management system 600 may implement noisification 670 to provide security for soft identities. By adding locally privatized noise to personal data, the differential privacy management system 600 may ensure that the stored personal data still supports beneficial data analysis, but drilling down into a specific set of soft identities leads to a strong probability that the specific set of soft identities includes or represents noise (e.g., as opposed to a particular, unique user). The differential privacy management system 600 may perform tokenization, noisification 670, or both when writing data 665, reading data 665, or some combination thereof. For example, the differential privacy management system 600 may perform tokenization on data entering the system (e.g., at write time) and may perform noisification 670 on data leaving the system (e.g., at read time).

The differential privacy management system 600 may perform encryption processes according to data processing permits as described herein. For example, a smart contract 620 may support permit management 625 (e.g., including the creation 630, revocation 635, and/or querying 640 of permits) and may use these permits to encrypt 645 and decrypt 650 the data 665. The smart contract 620 may receive data, retrieve a permit key 660 (e.g., a secret) associated with a permit relevant to the data (e.g., from a distributed ledger 655 supporting a permit store), encrypt 645 the data using a cryptographic nonce, and encrypt the nonce using the permit key 660. The differential privacy management system 600 may store the data encrypted using a nonce (e.g., data which may be modified using tokenization, differential privacy techniques, or both) in an encrypted database 675.

In some cases, a data processing system 610 or organization may request data from the encrypted database 675 for a particular data processing use case (e.g., a data processing use case consented to by the user) using a data request 680. The encrypted database 675 may send the encrypted data and encrypted nonce to the smart contract 620, and the smart contract 620 may retrieve the permit key 660 associated with the permit relevant to the data, decrypt the nonce using the permit key 660, and decrypt 650 the data using the decrypted nonce. In some cases, a central aggregator 685 may aggregate data (e.g., from multiple decrypted ciphertext blobs, for multiple users, across multiple data points for a user, etc.) according to the data request 680, and the differential privacy management system 600 may return the unencrypted data 690 for use by the data processing system 610 or organization. While the data may be unencrypted, the data may remain modified according to the tokenization, differential privacy techniques, or both. For example, in some cases, the central aggregator 685, smart contract 620, or both may perform tokenization, differential privacy techniques, or both when reading the data from the encrypted database 675. The data processing system 610 or organization receiving the unencrypted data 690 for data processing may not uniquely identify the user based on the user's data. However, based on the aggregation, the aggregate-level data may provide useful analytical information.

In some cases, the differential privacy management system 600 may implement local differential privatization and encryption of data for a number of user devices 605. For example, multiple user devices 605 may input data to the system, and the system may debias the data for each user device 605 separately, perform differential privacy techniques on the data separately, and encrypt the data separately. In some cases, to serve a data request, the system may centrally aggregate the data for the multiple user devices 605 (e.g., upon or after decryption). For example, the system may map the data onto a sketch matrix, M, transform the sketch matrix using a Hadamard matrix, H, and may average the data from the user devices 605 based on the matrix transformation. The system may return aggregate data for the user devices 605 based on the implemented differential privacy techniques.

In some cases, the permit management (e.g., including the smart contracts 620, the distributed ledger 655, the permit store, the encryption processes, etc.) may be handled by a securitization service. In some examples, the securitization service may include a blockchain network, such as Hyperledger Fabric (or any other blockchain network). The blockchain network, N, may support a distributed ledger 655 for improved security, improved processing resources, or a combination thereof. For example, the blockchain network, N, may include a set of distributed peer nodes 615, where each peer node 615 may include a smart contract 620 (e.g., chaincode) and a ledger 655. In some systems, each peer node 615 may include the same smart contract 620 and ledger 655 (e.g., a peer node P1 may include a smart contract S1 and a ledger L1, a peer node P2 may include the smart contract S1 and the ledger L1, a peer node P3 may include the smart contract S1 and the ledger L1, etc.). A client application may interact with the blockchain network via SDKs, representational state transfer (REST) web services, or both. The client application may send a transaction invocation request to a peer node 615 of the blockchain network, and the peer node 615 may handle the transaction invocation request based on the chaincode (e.g., smart contract 620) installed at the peer node 615. The peer nodes 615 may maintain a single distributed ledger 655 (e.g., one ledger 655 per channel), were the ledger 655 may include the set of data processing permits for managing data processing and security.

Figure 7:
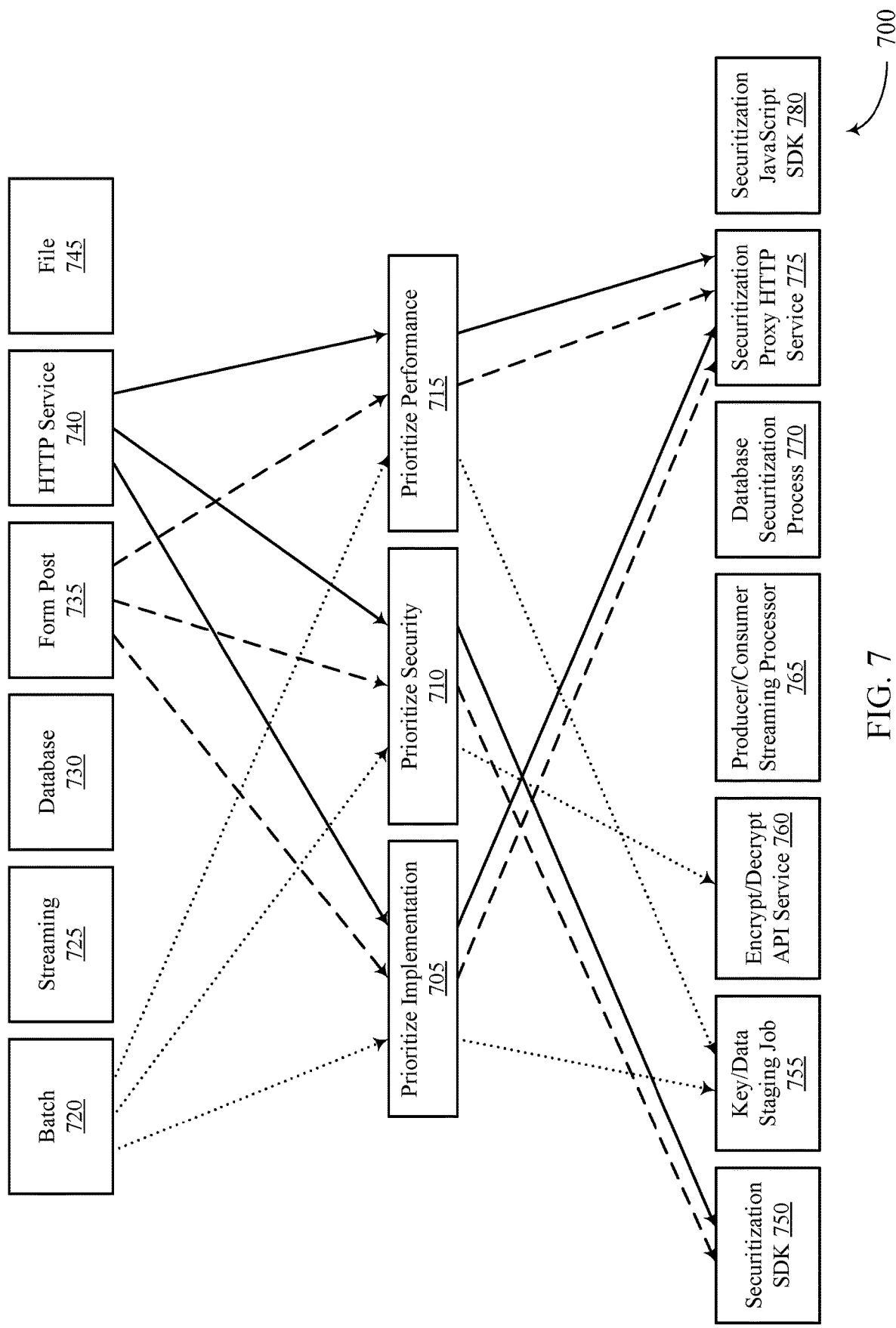
FIG. 7 illustrates an example of integration methods that support a data processing permits system with keys in accordance with aspects of the present disclosure.

FIG. 7 illustrates an example of integration methods 700 that support a data processing permits system with keys in accordance with aspects of the present disclosure. The integration methods 700 may be implemented in a system 100, a system 200, a data handling framework 300, a data management system 400, an encryption system 500, or a differential privacy management system 600 as described with reference to FIGS. 1 through 6. For example, the integration methods 700 may support implementing one or more architectures for performing encryption processes (e.g., data encryption, data decryption, data re-encryption, etc.) to manage data security. In some cases, a system may support any of the integration methods 700 described herein, where an organization may select an integration method 700 based on the priorities of the organization. In some other cases, the system may support a subset of the integration methods 700 described herein or may support additional integration methods 700.

For example, a system may support encryption of form posts 735, HTTP services 740, files 745, or other forms of information. The system may additionally or alternatively support batch decryption 720, streaming decryption 725, and/or database decryption 730. In some cases, the system may additionally or alternatively support batch re-encryption and/or streaming re-encryption. The system may implement different methods to perform the encryption processes supported by the system based on organizational priorities. For example, the system may implement a first set of techniques to support prioritizing implementation 705 (e.g., to achieve a "best" implementation), a second set of techniques to support prioritizing security 710 (e.g., to achieve a "best" security), or a third set of techniques to support prioritizing performance 715 (e.g., to achieve a "best" performance). In some cases, the system may implement techniques based on a tradeoff between implementation, security, performance, or some combination of these or other organizational priorities. For example, the integration methods 700 may support a tradeoff between implementation complexity and security. In some examples, to prioritize implementation complexity and/or performance, the system may identify a data process and, prior to the data process, access the data, check permits, and decrypt the data based on the permits so that the data is ready (i.e., decrypted) for the start of the data process without modifying the data processing job. In some other examples, to prioritize security, the system may modify the data processing job to include the decryption process.

Tables 1, 2, and 3 recite examples of techniques that the system may use to achieve different prioritizations. However, it is to be understood that other prioritizations and/or techniques may be supported by the system. Some example services and techniques may include a securitization SDK 750, a key/data staging job 755, an encrypt/decrypt API service 760, a producer/consumer streaming processor 765, a database securitization process 770, a securitization proxy HTTP service 775, a securitization JavaScript SDK 780, or any combination of these or other relevant services or techniques. The integration methods 700 may implement any combination of these services or techniques in order to prioritize implementation, security, performance, or perform some tradeoff between these different prioritizations.

TABLE 1

Encryption Techniques

|  | Form Post | HTTP service | File |
| --- | --- | --- | --- |
| Min Implementation cost | Proxy (form action swop) | Proxy | Data Unstage |
| Min Security cost | Proxy/ SDK | Proxy/ SDK | Data Unstage/ Key Unstage (if originally encrypted) |
| Min performance cost | Proxy/ SDK | Proxy/ SDK | Data Unstage |

TABLE 2

Decryption Techniques

|  | Batch | Streaming | DB |
| --- | --- | --- | --- |
| Min Implementation cost | Data Stage | Consumer/ Producer | Data Stage (filter and projection) |
| Min Security cost | On-the-Fly/ Key Stage | On-the-Fly | On-the-Fly |
| Min performance cost | Key Stage/ Data Stage | Consumer/ Producer | Data Stage (filter and projection) |

TABLE 3

Re-Encryption Techniques

|  | Batch | Streaming |
| --- | --- | --- |
| Min Implementation cost | Data Unstage | Consumer/Producer |
| Min Security cost | On-the-Fly | On-the-Fly |
| Min performance cost | Key Unstage | Consumer/Producer |

Figure 8:
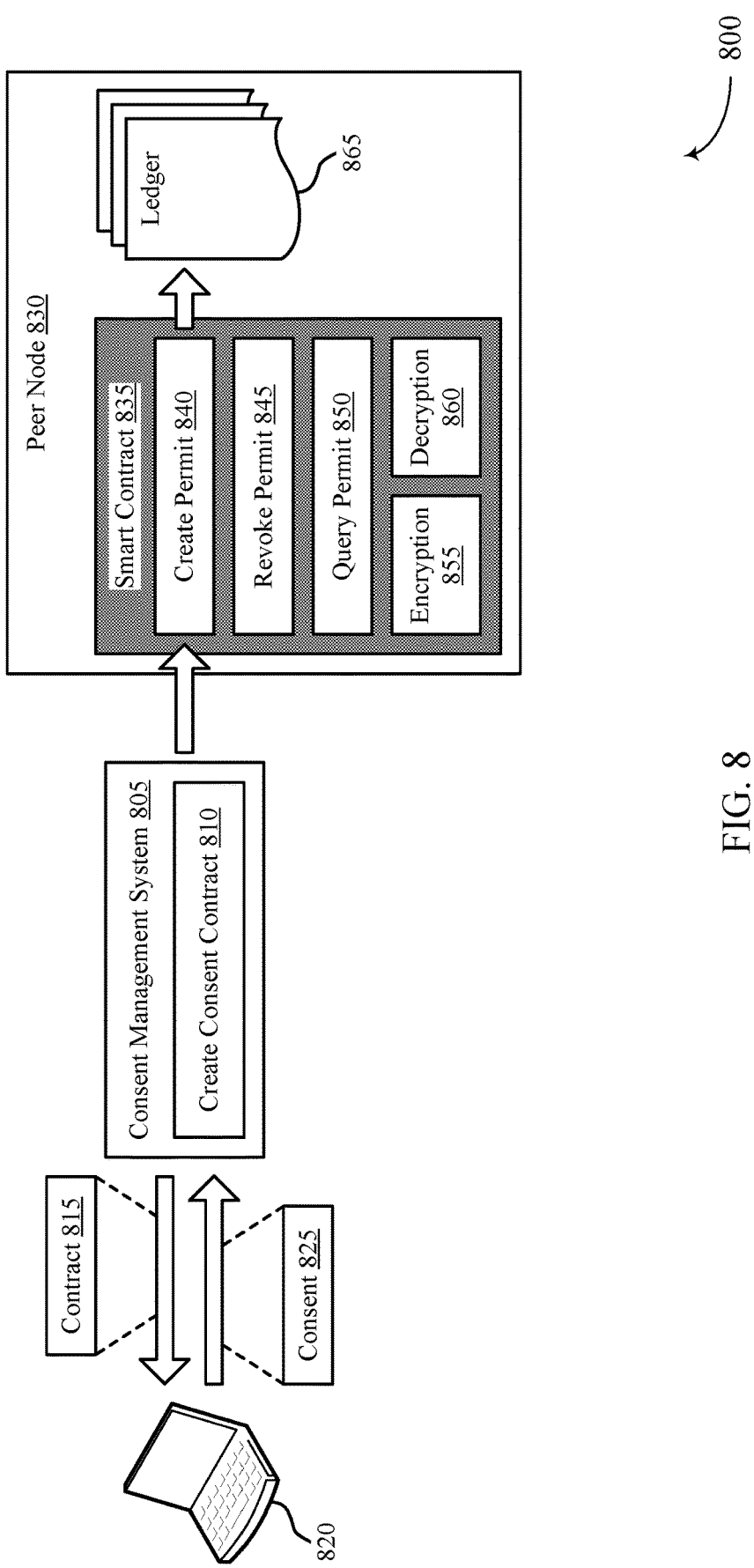
FIG. 8 illustrates an example of a system for permit creation that supports data processing permits with keys in accordance with aspects of the present disclosure.

FIG. 8 illustrates an example of a system 800 for permit creation that supports data processing permits with keys in accordance with aspects of the present disclosure. The system 800 may be implemented in a system 100, a system 200, a data handling framework 300, a data management system 400, an encryption system 500, or a differential privacy management system 600 as described with reference to FIGS. 1 through 6. The system 800 may handle permit creation, permit updating, and permit deletion. In some cases, the system 800 may additionally handle changes to the processing activities supported by the system 800. In some examples, the system 800 may support a distributed ledger 865. For example, multiple peer nodes 830 in a blockchain network may include chaincode (such as a smart contract 835), a ledger 865, or both for handling data processing permits.

The system 800 may support consent management for multiple users (e.g., using a consent management system 805). In some cases, an organization (e.g., an organization utilizing and/or subscribed to the system 800) may create a consent contract at 810. The system 800 may display the consent contract 815 to a user (e.g., a consumer) via a UI. For example, the user may operate a user device 820, and the user device 820 may receive a consent contract 815 and display the consent contract 815 in the UI of the user device 820. The user may give consent 825 to the system 800 (e.g., based on inputting information to the UI). For example, the user may select to give consent 825 for the system 800 to store personal data for the user to be used by the system 800 for specific data processing activities. If the user consents to a data processing activity already covered by a data processing permit, the system 800 may query a permit store and identify the corresponding permit. In some cases, the system 800 may support changes to the existing permit. For example, based on the user input, the system 800 may query the relevant data processing permit and update the parameters of the data processing permit (e.g., based on the user's consent 825).

In some other cases, based on the user consent 825, the system 800 (e.g., at an application server) may create a data processing permit 840 indicating the user's consent 825. For example, based on the user's selections, the system 800 may generate a data processing permit indicating the user and the data processing activity consented to by the user. This generated permit may be added to a permit store (e.g., a distributed ledger 865 shared between peer nodes 830). In a first example, the new permit may not affect data already stored by the system 800. For example, the system 800 may begin collecting data relevant to the new permit upon creation of the permit (e.g., by using the corresponding permit key to encrypt a cryptographic nonce used for relevant data). In a second example, the system 800 may search for data previously collected (e.g., based on another permit) that applies to the new permit. In some cases, the system 800 may use a different permit (e.g., the permit allowing the system 800 to have previously collected the data) to decrypt the cryptographic nonce for the relevant data and re-encrypt the cryptographic nonce using the permit key for the new permit (i.e., such that the new permit can be used to decrypt the relevant data already stored for the system 800). In some other cases, the permit key allowing the system 800 to have previously collected the data may be updated to point to the new permit. In some implementations, a user may configure how the system 800 handles new permits, new data processing activities, updates to permits, etc. Similarly, a user may configure how the system 800 handles ramp up (e.g., from a cold start). In some cases, the system 800 may batch the data previously stored by the system 800 using newly defined data processing permits (e.g., where the data processing permits are manually or automatically generated for the system 800 during an onboarding process). In some other cases, the system 800 may delete the data previously stored (e.g., to mitigate data regulation violations) and may use the newly defined data processing permits to start collecting data (i.e., starting from a "blank slate").

In some examples, the user may revoke a permit 845. For example, a user may revoke consent for the system 800 to use the user's data for particular data processing activities. In such an example, the system 800 may search the permit store (e.g., the distributed ledger 865) for permits associated with the particular data processing activities and may delete the corresponding permits (or at least delete the permit keys for the corresponding permits and modify the permit to indicate that the user no longer consents to the associated data processing activity). The system 800 may also support querying permits 850. For example, upon request by the user or based on a data processing request, the system 800 may query the permit store (e.g., the ledger 865) to identify any relevant data processing permits. The permits may be queried based on the corresponding user, the corresponding data processing activity, associated personal data, or some combination thereof. The system 800 may additionally support encryption processes (e.g., encryption 855, decryption 860, re-encryption, key rotation, etc.) using the data processing permits.

Figure 9:
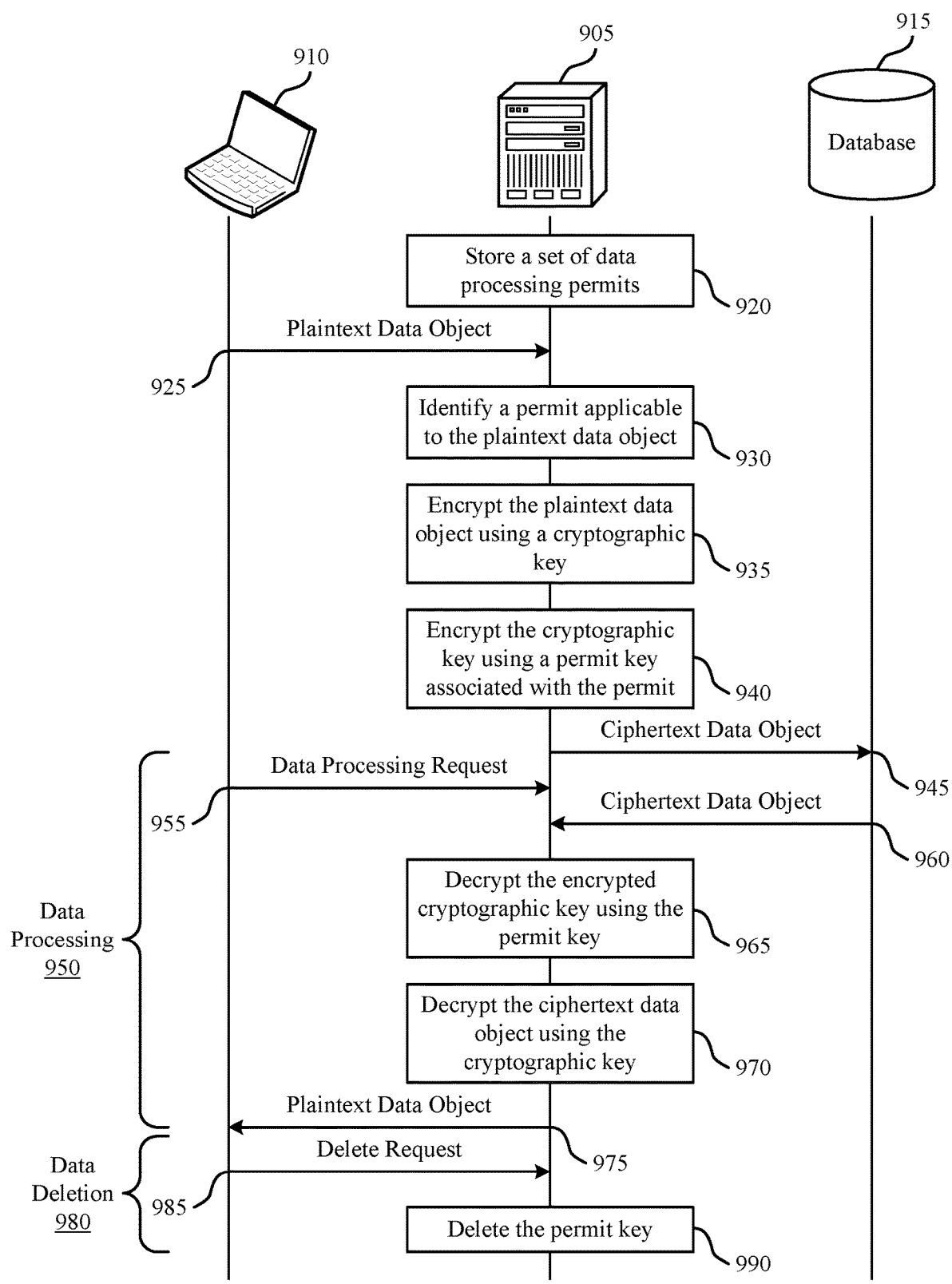
FIG. 9 illustrates an example of a process flow that supports a data processing permits system with keys in accordance with aspects of the present disclosure.

FIG. 9 illustrates an example of a process flow 900 that supports a data processing permits system with keys in accordance with aspects of the present disclosure. The process flow 900 may include an application server 905 managing an SOR for data processing permits and implementing cryptography to tie the permits to data. The application server 905 may communicate with a user device 910, a database 915, or both. The application server 905 may manage data privacy for a system. In some cases, the application server 905 may support technical guarantees for privacy compliant data processing, data securitization (e.g., encrypted data at rest), automatic data deletion via permit key deletion, audit logs, monitoring, or any combination of these features based on implementing a data processing permit SOR and cryptography procedures. Alternative examples of the following may be implemented, where some steps are performed in a different order than described or are not performed at all. In some cases, steps may include additional features not mentioned below, or further steps may be added.

At 920, the application server 905 may store a set of permits (e.g., data processing permits), where each permit includes a respective associated data processing activity. Each permit may be specific to a particular user.

At 925, the application server 905 may receive a plaintext data object. For example, a user device 910 may transmit the plaintext data object to the application server 905. In some cases, the plaintext data object may be an example of personal information for a user operating the user device 910.

At 930, the application server 905 may identify a permit of the set of permits applicable to the plaintext data object according to an associated data processing activity for the identified permit. For example, the plaintext data object may correspond to personal information for a user, and the identified permit may include consent from the user for the system to use the personal information for a data processing activity.

At 935, the application server 905 may encrypt the plaintext data object using a cryptographic key (e.g., a cryptographic nonce) to obtain a ciphertext object (e.g., an encrypted data object). In some cases, the application server 905 may generate the cryptographic key for the plaintext data object. In some other cases, the application server 905 may receive the cryptographic key from a key management system or nonce generation service. The cryptographic key may be an example of a cryptographic nonce.

At 940, the application server 905 may further encrypt the cryptographic key using a permit key including a pointer to the identified permit. The encrypted cryptographic key (e.g., a cipher-nonce) may be associated with an identifier indicating the permit key (e.g., a key ID corresponding to the permit key and pointing to the identified permit).

At 945, the application server 905 may transmit the ciphertext object to the database 915 for storage. In some cases, the application server 905 may send the encrypted cryptographic key (e.g., the encrypted nonce), the identifier indicating the permit key (e.g., the key ID for the permit key), or both with the ciphertext object. These components may be included in an encrypted datum bundle sent to the database 915 for storage.

In some cases, the application server 905 may perform data processing 950 tied to the permits and encryption. For example, at 955, the application server 905 may receive a request to perform a data processing activity (e.g., the data processing activity associated with the permit identified at 930). At 960, the application server 905 may retrieve the ciphertext object (e.g., from the database 915) based on receiving the request. In some cases, the application server 905 may additionally retrieve the encrypted cryptographic key (e.g., the encrypted nonce), the identifier indicating the permit key (e.g., the key ID for the permit key), or both.

At 965, the application server 905 may decrypt the encrypted cryptographic key using the permit key for the identified permit. The application server 905 may obtain the cryptographic key (e.g., the decrypted cryptographic nonce) as a result of the decryption. At 970, the application server 905 may decrypt the ciphertext object using the cryptographic key to obtain the plaintext data object. At 975, the application server 905 may send the plaintext data object for processing according to the requested data processing activity. For example, the application server 905 may send the plaintext data object to the user device 910 that sent the data processing request or may send the plaintext data object to another system or component that performs the requested processing activity.

In some cases, the application server 905 may perform data deletion 980 using the permits. For example, at 985, the application server 905 may receive a delete request for the plaintext data object. In some cases, a user may send a request (e.g., via the user device 910) for the applications server 905 to delete the user's personal data stored at the database 915. At 990, the application server 905 may delete the permit key for the data processing permit applicable to the plaintext data object based on the delete request. For example, by deleting all permit keys that can decrypt the encrypted cryptographic key (e.g., the encrypted nonce) used for the plaintext data object, the application server 905 effectively deletes the plaintext data object (e.g., as the system can no longer decrypt this information). As such, the application server 905 may temporarily maintain the ciphertext object in the system (e.g., at database 915) after deleting the permit key, because the system cannot decrypt this ciphertext object based on deleting the permit key. By deleting the permit key (e.g., rather than searching for any relevant data objects for deletion in the database 915), the system may significantly reduce the processing overhead and latency involved in responding to the user's delete request.

Figure 10:
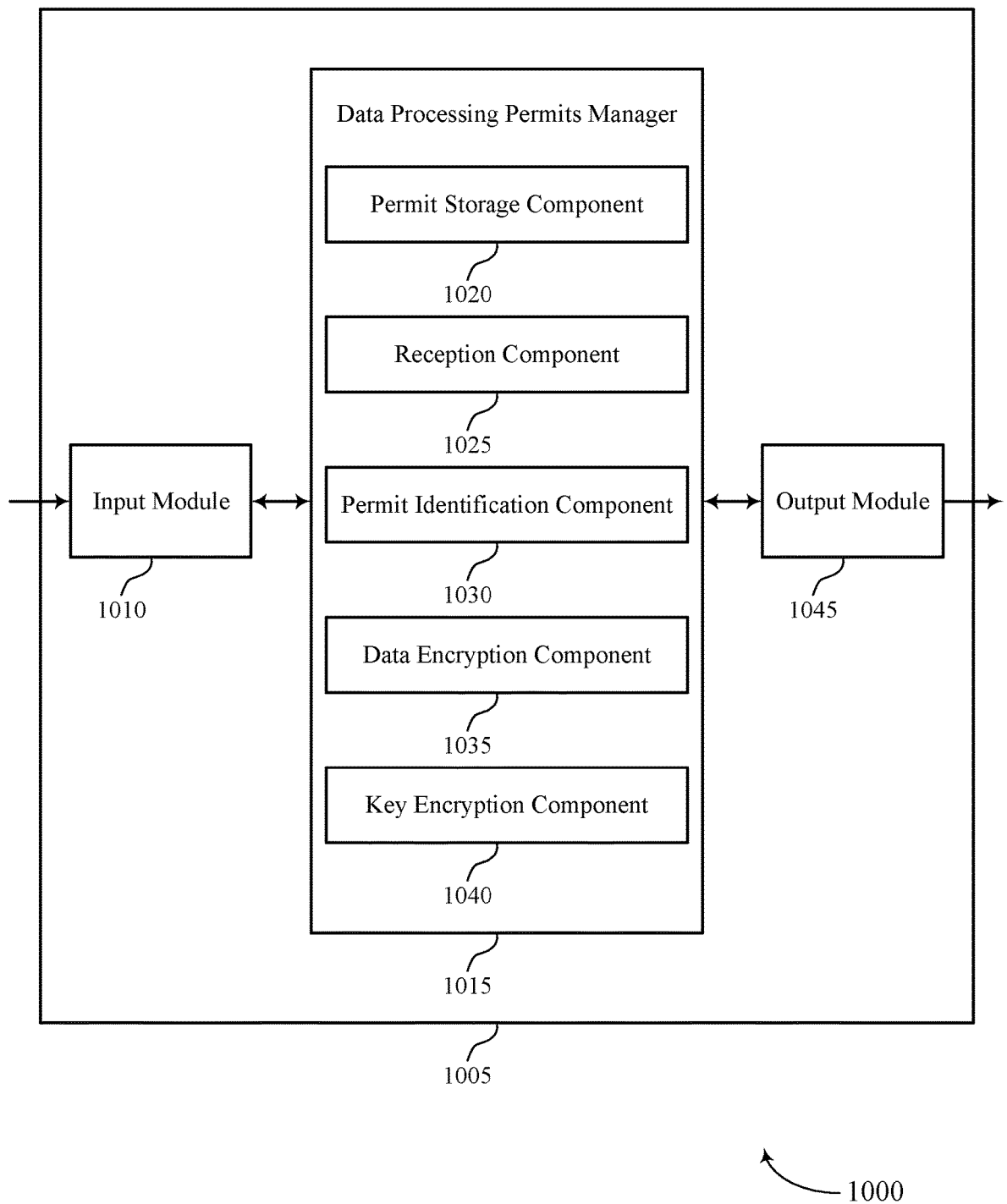
FIG. 10 shows a block diagram of an apparatus that supports a data processing permits system with keys in accordance with aspects of the present disclosure.

FIG. 10 shows a block diagram 1000 of an apparatus 1005 that supports a data processing permits system with keys in accordance with aspects of the present disclosure. The apparatus 1005 may include an input module 1010, a data processing permits manager 1015, and an output module 1045. The apparatus 1005 may also include a processor. Each of these components may be in communication with one another (e.g., via one or more buses). In some cases, the apparatus 1005 may be an example of a user terminal, a server (e.g., an application server, a database server, a cloud-based server, a server cluster, a virtual machine, a container, etc.), or a system containing multiple computing devices.

The input module 1010 may manage input signals for the apparatus 1005. For example, the input module 1010 may identify input signals based on an interaction with a modem, a keyboard, a mouse, a touchscreen, or a similar device. These input signals may be associated with user input or processing at other components or devices. In some cases, the input module 1010 may utilize an operating system such as iOS®, ANDROID®, MS-DOS®, MS-WINDOWS®, OS/2, UNIX®, LINUX®, or another known operating system to handle input signals. The input module 1010 may send aspects of these input signals to other components of the apparatus 1005 for processing. For example, the input module 1010 may transmit input signals to the data processing permits manager 1015 to support a data processing permits system. In some cases, the input module 1010 may be a component of an input/output (I/O) controller 1215 as described with reference to FIG. 12.

The data processing permits manager 1015 may include a permit storage component 1020, a reception component 1025, a permit identification component 1030, a data encryption component 1035, and a key encryption component 1040. The data processing permits manager 1015 may be an example of aspects of the data processing permits manager 1105 or 1210 described with reference to FIGS. 11 and 12.

The data processing permits manager 1015 and/or at least some of its various sub-components may be implemented in hardware, software executed by a processor, firmware, or any combination thereof. If implemented in software executed by a processor, the functions of the data processing permits manager 1015 and/or at least some of its various sub-components may be executed by a general-purpose processor, a digital signal processor (DSP), an application-specific integrated circuit (ASIC), a field-programmable gate array (FPGA) or other programmable logic device, discrete gate or transistor logic, discrete hardware components, or any combination thereof designed to perform the functions described in the present disclosure. The data processing permits manager 1015 and/or at least some of its various sub-components may be physically located at various positions, including being distributed such that portions of functions are implemented at different physical locations by one or more physical devices. In some examples, the data processing permits manager 1015 and/or at least some of its various sub-components may be a separate and distinct component in accordance with various aspects of the present disclosure. In other examples, the data processing permits manager 1015 and/or at least some of its various sub-components may be combined with one or more other hardware components, including but not limited to an I/O component, a transceiver, a network server, another computing device, one or more other components described in the present disclosure, or a combination thereof in accordance with various aspects of the present disclosure.

The data processing permits manager 1015 may manage data privacy for a system. For example, the permit storage component 1020 may store a set of data processing permits, where each data processing permit of the set of data processing permits includes a respective associated data processing activity. The reception component 1025 may receive a plaintext data object for the system. The permit identification component 1030 may identify a data processing permit of the set of data processing permits applicable to the plaintext data object according to an associated data processing activity for the identified data processing permit. The data encryption component 1035 may encrypt the plaintext data object using a cryptographic key (e.g., a cryptographic nonce) to obtain a ciphertext object. The key encryption component 1040 may encrypt the cryptographic key using a permit key (e.g., a secret) including a pointer to the identified data processing permit, where the encrypted cryptographic key (e.g., a cipher-nonce) is associated with an identifier (e.g., a key ID) indicating the permit key.

The output module 1045 may manage output signals for the apparatus 1005. For example, the output module 1045 may receive signals from other components of the apparatus 1005, such as the data processing permits manager 1015, and may transmit these signals to other components or devices. In some specific examples, the output module 1045 may transmit output signals for display in a user interface, for storage in a database or data store, for further processing at a server or server cluster, or for any other processes at any number of devices or systems. In some cases, the output module 1045 may be a component of an I/O controller 1215 as described with reference to FIG. 12.

Figure 11:
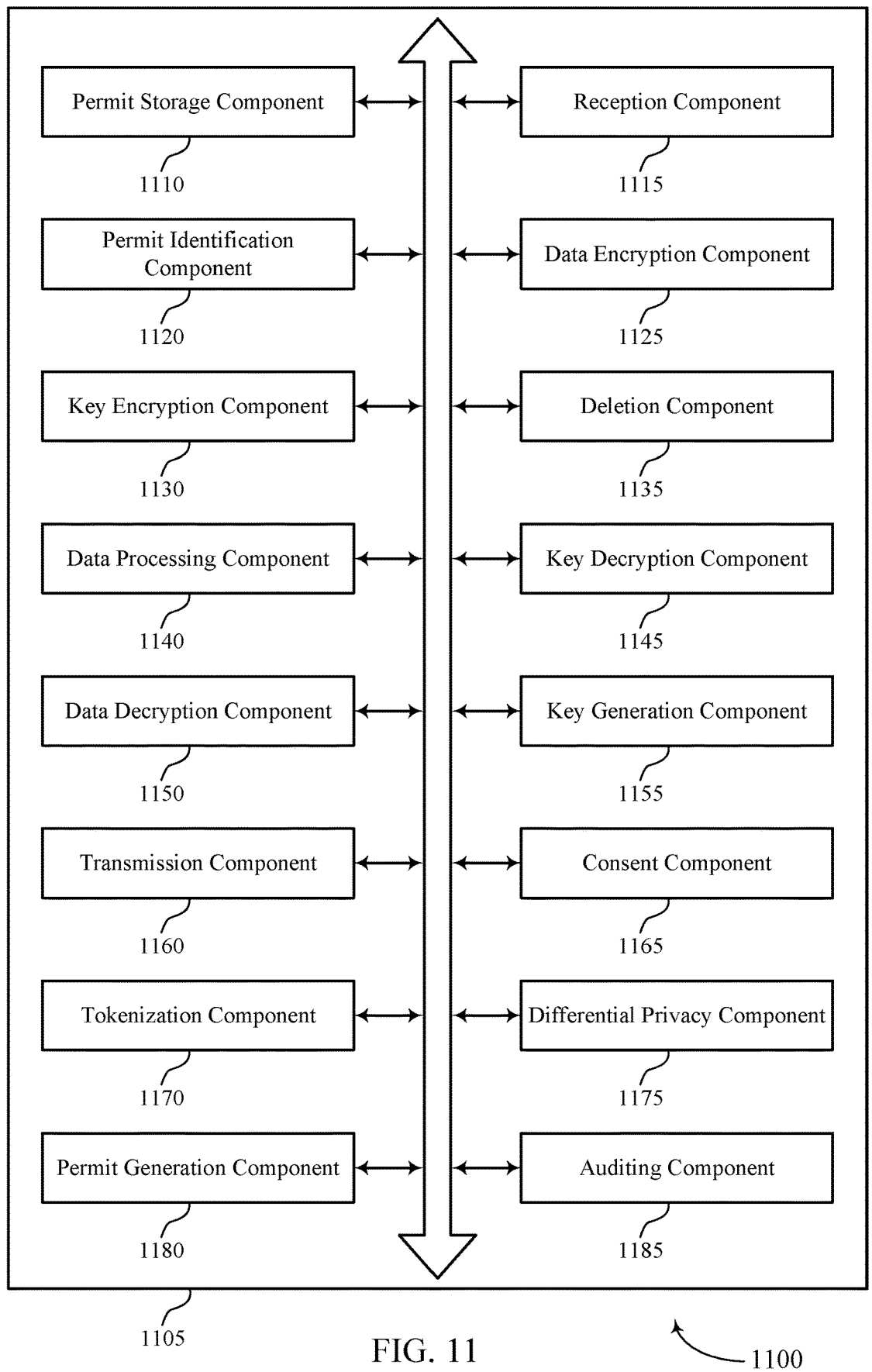
FIG. 11 shows a block diagram of a data processing permits manager that supports a data processing permits system with keys in accordance with aspects of the present disclosure.

FIG. 11 shows a block diagram 1100 of a data processing permits manager 1105 that supports a data processing permits system with keys in accordance with aspects of the present disclosure. The data processing permits manager 1105 may be an example of aspects of a data processing permits manager 1015 or a data processing permits manager 1210 described herein. The data processing permits manager 1105 may include a permit storage component 1110, a reception component 1115, a permit identification component 1120, a data encryption component 1125, a key encryption component 1130, a deletion component 1135, a data processing component 1140, a key decryption component 1145, a data decryption component 1150, a key generation component 1155, a transmission component 1160, a consent component 1165, a tokenization component 1170, a differential privacy component 1175, a permit generation component 1180, an auditing component 1185, or a combination thereof. Each of these modules may communicate, directly or indirectly, with one another (e.g., via one or more buses).

The data processing permits manager 1105 may manage data privacy for a system. The permit storage component 1110 may store a set of data processing permits, where each data processing permit of the set of data processing permits includes a respective associated data processing activity. In some cases, each data processing permit of the set of data processing permits may correspond to a respective user. For example, the set of data processing permits may correspond to a set of data privacy regulations, a set of data processing activities, a set of device identities, a set of users, or a combination thereof, each user of the set of users may correspond to multiple data processing permits of the set of data processing permits, and each data processing permit of the set of data processing permits may correspond to a respective user of the set of users.

The reception component 1115 may receive a plaintext data object for the system. In some cases, the plaintext data object may include a set of key-value pairs. The permit identification component 1120 may identify a data processing permit of the set of data processing permits applicable to the plaintext data object according to an associated data processing activity for the identified data processing permit.

The data encryption component 1125 may encrypt the plaintext data object using a cryptographic key to obtain a ciphertext object. The key encryption component 1130 may encrypt the cryptographic key using a permit key including a pointer to the identified data processing permit, where the encrypted cryptographic key is associated with an identifier indicating the permit key.

The deletion component 1135 may receive a delete request for the plaintext data object. In some examples, the deletion component 1135 may delete the permit key used to encrypt the cryptographic key based on the delete request and may maintain the ciphertext object in the system after deleting the permit key based on deleting the permit key. In some cases, the plaintext data object is inaccessible from the ciphertext object based on deleting the permit key.

In some examples, the data processing component 1140 may receive a request to perform the associated data processing activity for the identified data processing permit. The reception component 1115 may retrieve the ciphertext object, the encrypted cryptographic key, and the identifier indicating the permit key based on receiving the request. The key decryption component 1145 may decrypt the encrypted cryptographic key using the permit key to obtain the cryptographic key. The data decryption component 1150 may decrypt the ciphertext object using the cryptographic key to obtain the plaintext data object. The data processing component 1140 may send the plaintext data object for processing according to the associated data processing activity based on the request.

The key generation component 1155 may generate the cryptographic key for the plaintext data object based on receiving the plaintext data object. In some cases, the cryptographic key is an example of a cryptographic nonce.

The transmission component 1160 may transmit the ciphertext object, the encrypted cryptographic key, and the identifier indicating the permit key to the system for storage.

In some examples, the permit identification component 1120 may identify an additional data processing permit of the set of data processing permits applicable to the plaintext data object according to an additional associated data processing activity for the additional identified data processing permit. In some such examples, the key encryption component 1130 may encrypt the cryptographic key using an additional permit key including an additional pointer to the additional identified data processing permit, where the encrypted cryptographic key that is encrypted using the additional permit key is associated with an identifier indicating the additional permit key.

In some examples, the reception component 1115 may receive an additional plaintext data object for the system. In some such examples, the permit identification component 1120 may identify that the data processing permit of the set of data processing permits is further applicable to the additional plaintext data object according to the associated data processing activity for the identified data processing permit. The data encryption component 1125 may encrypt the additional plaintext data object using an additional cryptographic key to obtain an additional ciphertext object. The key encryption component 1130 may encrypt the additional cryptographic key using the permit key including the pointer to the identified data processing permit, where the additional encrypted cryptographic key is associated with an additional identifier indicating the permit key.

The consent component 1165 may receive, from a user device, an indication of consent for the system to support the associated data processing activity for a user operating the user device. In some examples, the consent component 1165 may generate the identified data processing permit for the user based on the indication of consent, the identified data processing permit including the associated data processing activity. In some examples, the consent component 1165 may determine a consent contract for the user and transmit, for display at the user device, the consent contract for the user, where the indication of consent is received based on the consent contract.

In some cases, the tokenization component 1170 may determine that the plaintext data object includes a hard identifier for a user and may tokenize the plaintext data object prior to encrypting the plaintext data object based on the determining. Additionally or alternatively, the differential privacy component 1175 may determine that the plaintext data object includes a soft identifier for a user and may modify the plaintext data object according to a differential privacy procedure prior to sending the plaintext data object for processing based on the determining.

The permit generation component 1180 may generate the set of data processing permits based on a data catalog for the system. The auditing component 1185 may maintain an audit log for the system.

The permit generation component 1180 may receive an update to a legitimizing reason for storing the plaintext data object and may store an updated data processing permit based on the update to the legitimizing reason for storing the plaintext data object. The permit generation component 1180 may update the pointer of the permit key such that the pointer is to the updated data processing permit and not to the identified data processing permit based on the update to the legitimizing reason for storing the plaintext data object and storing the updated data processing permit.

Figure 12:
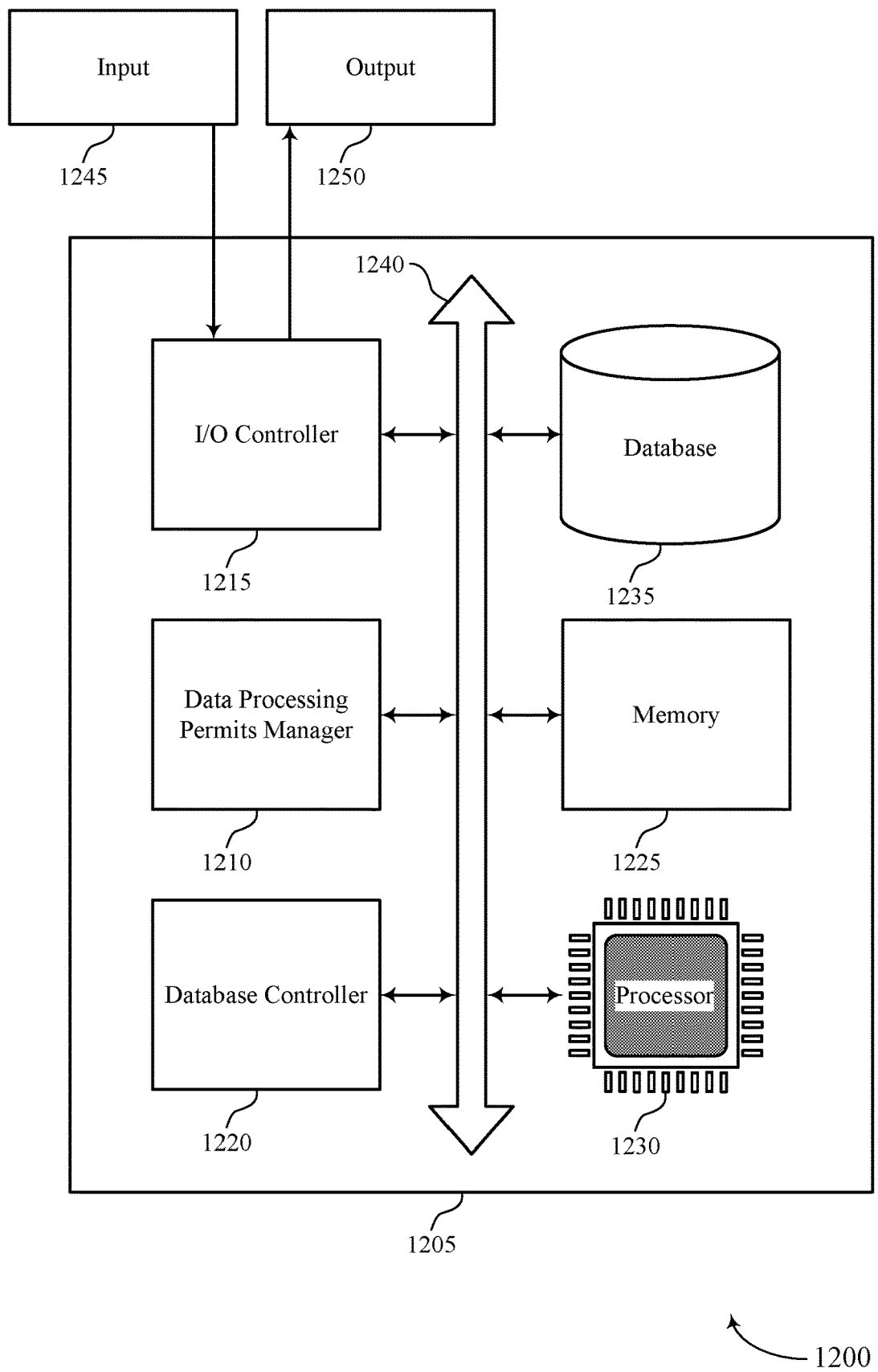
FIG. 12 shows a diagram of a system including a device that supports data processing permits with keys in accordance with aspects of the present disclosure.

FIG. 12 shows a diagram of a system 1200 including a device 1205 that supports data processing permits with keys in accordance with aspects of the present disclosure. The device 1205 may be an example of or include the components of an application server or an apparatus 1005 as described herein. The device 1205 may include components for bi-directional data communications including components for transmitting and receiving communications, including a data processing permits manager 1210, an I/O controller 1215, a database controller 1220, memory 1225, a processor 1230, and a database 1235. These components may be in electronic communication via one or more buses (e.g., bus 1240).

The data processing permits manager 1210 may be an example of a data processing permits manager 1015 or 1105 as described herein. For example, the data processing permits manager 1210 may perform any of the methods or processes described above with reference to FIGS. 10 and 11. In some cases, the data processing permits manager 1210 may be implemented in hardware, software executed by a processor, firmware, or any combination thereof.

The I/O controller 1215 may manage input signals 1245 and output signals 1250 for the device 1205. The I/O controller 1215 may also manage peripherals not integrated into the device 1205. In some cases, the I/O controller 1215 may represent a physical connection or port to an external peripheral. In some cases, the I/O controller 1215 may utilize an operating system such as iOS®, ANDROID®, MS-DOS®, MS-WINDOWS®, OS/2®, UNIX®, LINUX®, or another known operating system. In other cases, the I/O controller 1215 may represent or interact with a modem, a keyboard, a mouse, a touchscreen, or a similar device. In some cases, the I/O controller 1215 may be implemented as part of a processor. In some cases, a user may interact with the device 1205 via the I/O controller 1215 or via hardware components controlled by the I/O controller 1215.

The database controller 1220 may manage data storage and processing in a database 1235. In some cases, a user may interact with the database controller 1220. In other cases, the database controller 1220 may operate automatically without user interaction. The database 1235 may be an example of a single database, a distributed database, multiple distributed databases, a data store, a data lake, or an emergency backup database.

Memory 1225 may include random-access memory (RAM) and read-only memory (ROM). The memory 1225 may store computer-readable, computer-executable software including instructions that, when executed, cause the processor to perform various functions described herein. In some cases, the memory 1225 may contain, among other things, a basic I/O system (BIOS) which may control basic hardware or software operation such as the interaction with peripheral components or devices.

The processor 1230 may include an intelligent hardware device (e.g., a general-purpose processor, a DSP, a central processing unit (CPU), a microcontroller, an ASIC, an FPGA, a programmable logic device, a discrete gate or transistor logic component, a discrete hardware component, or any combination thereof). In some cases, the processor 1230 may be configured to operate a memory array using a memory controller. In other cases, a memory controller may be integrated into the processor 1230. The processor 1230 may be configured to execute computer-readable instructions stored in a memory 1225 to perform various functions (e.g., functions or tasks supporting a data processing permits system with keys).

Figure 13:
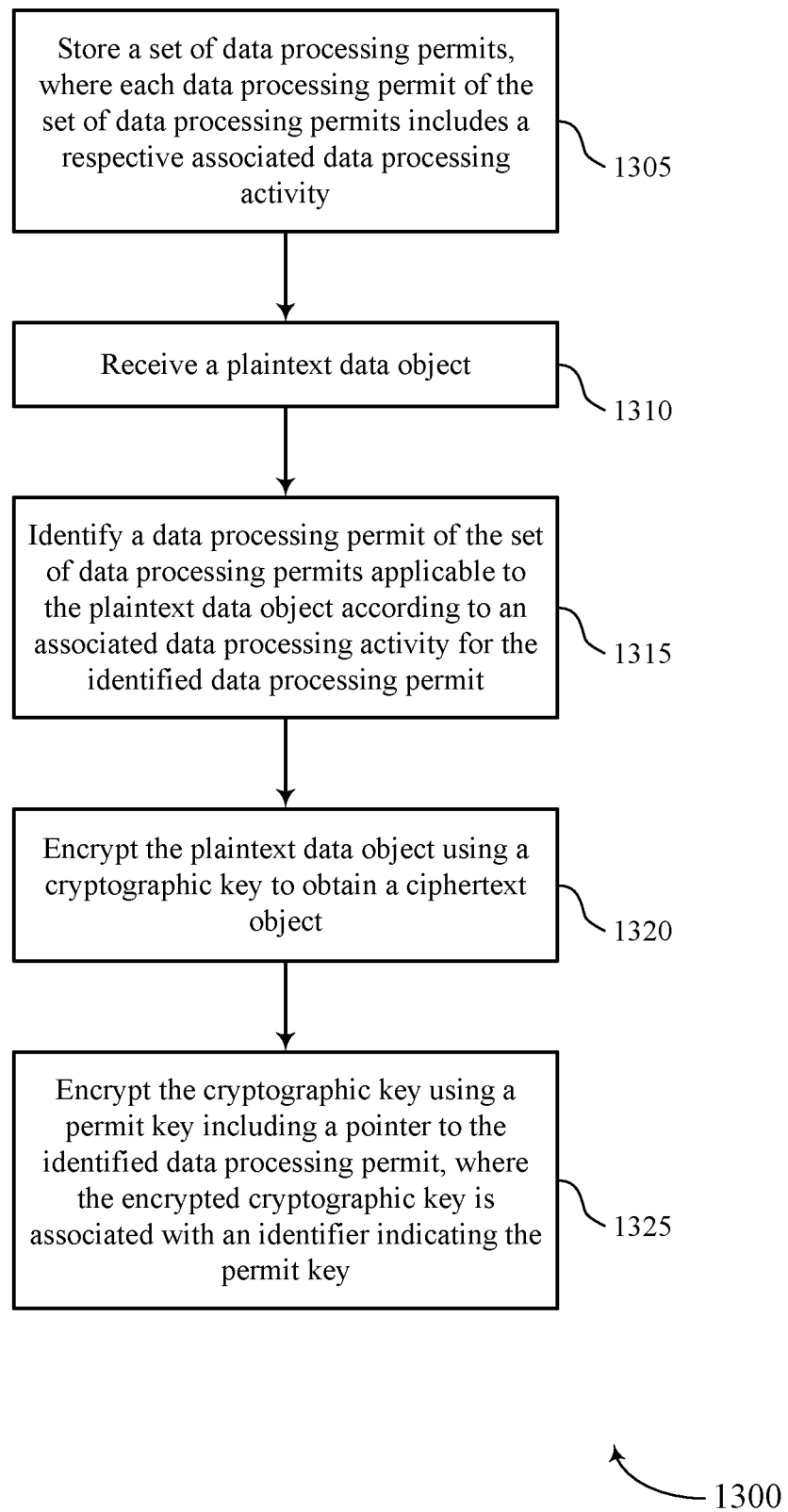
FIGS. 13 through 15 show flowcharts illustrating methods that support a data processing permits system with keys in accordance with aspects of the present disclosure.

FIG. 13 shows a flowchart illustrating a method 1300 that supports a data processing permits system with keys in accordance with aspects of the present disclosure. The operations of method 1300 may be implemented by an application server or its components as described herein. For example, the operations of method 1300 may be performed by a data processing permits manager as described with reference to FIGS. 10 through 12. In some examples, an application server may execute a set of instructions to control the functional elements of the application server to perform the functions described below. Additionally or alternatively, an application server may perform aspects of the functions described below using special-purpose hardware. The application server may support a method for managing data privacy for a system.

At 1305, the application server may store a set of data processing permits, where each data processing permit of the set of data processing permits includes a respective associated data processing activity. The operations of 1305 may be performed according to the methods described herein. In some examples, aspects of the operations of 1305 may be performed by a permit storage component as described with reference to FIGS. 10 through 12.

At 1310, the application server may receive a plaintext data object for the system. The operations of 1310 may be performed according to the methods described herein. In some examples, aspects of the operations of 1310 may be performed by a reception component as described with reference to FIGS. 10 through 12.

At 1315, the application server may identify a data processing permit of the set of data processing permits applicable to the plaintext data object according to an associated data processing activity for the identified data processing permit. The operations of 1315 may be performed according to the methods described herein. In some examples, aspects of the operations of 1315 may be performed by a permit identification component as described with reference to FIGS. 10 through 12.

At 1320, the application server may encrypt the plaintext data object using a cryptographic key to obtain a ciphertext object. The operations of 1320 may be performed according to the methods described herein. In some examples, aspects of the operations of 1320 may be performed by a data encryption component as described with reference to FIGS. 10 through 12.

At 1325, the application server may encrypt the cryptographic key using a permit key including a pointer to the identified data processing permit, where the encrypted cryptographic key is associated with an identifier indicating the permit key. The operations of 1325 may be performed according to the methods described herein. In some examples, aspects of the operations of 1325 may be performed by a key encryption component as described with reference to FIGS. 10 through 12.

Figure 14:
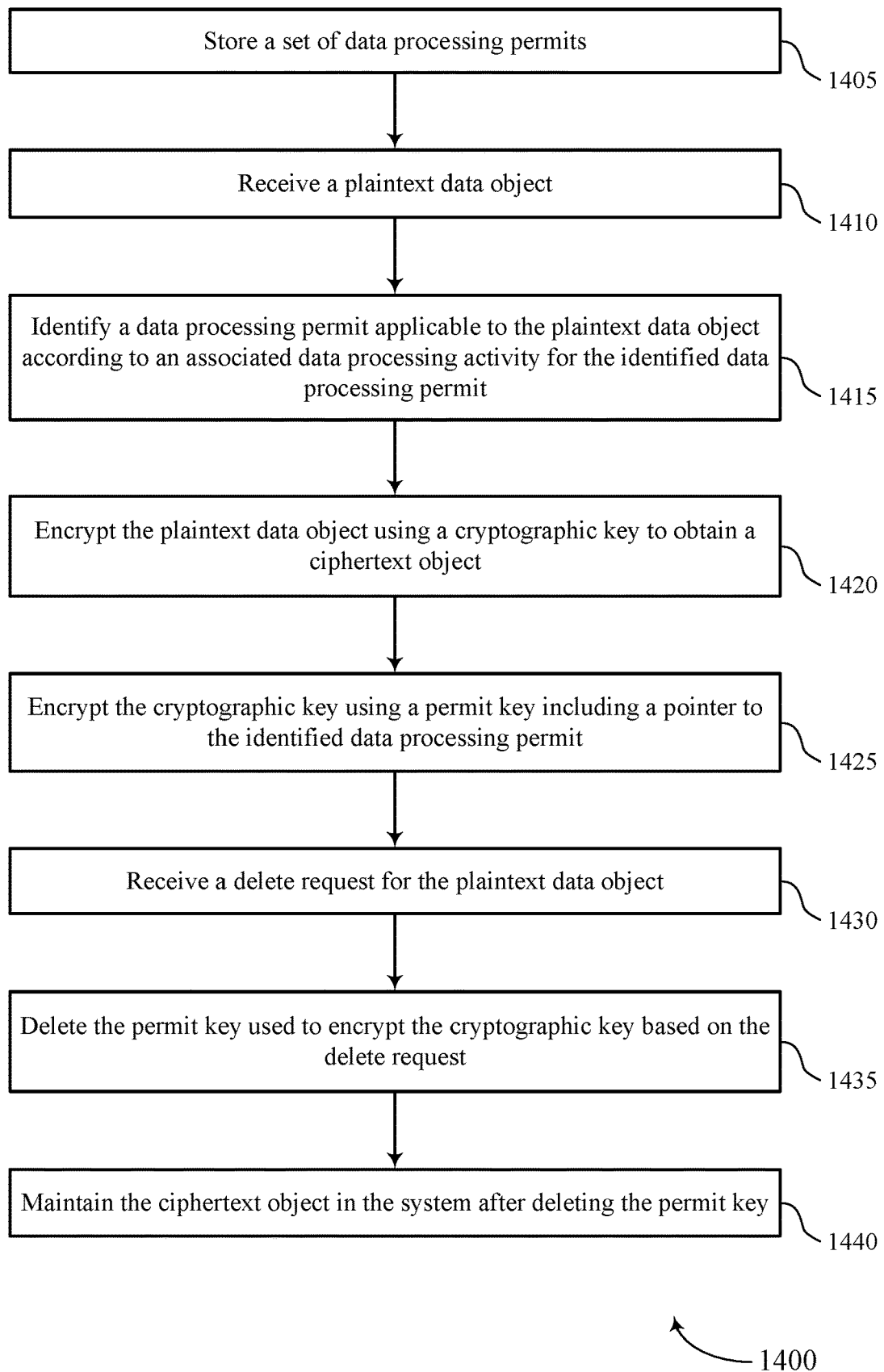

FIG. 14 shows a flowchart illustrating a method 1400 that supports a data processing permits system with keys in accordance with aspects of the present disclosure. The operations of method 1400 may be implemented by an application server or its components as described herein. For example, the operations of method 1400 may be performed by a data processing permits manager as described with reference to FIGS. 10 through 12. In some examples, an application server may execute a set of instructions to control the functional elements of the application server to perform the functions described below. Additionally or alternatively, an application server may perform aspects of the functions described below using special-purpose hardware.

At 1405, the application server may store a set of data processing permits, where each data processing permit of the set of data processing permits includes a respective associated data processing activity. The operations of 1405 may be performed according to the methods described herein. In some examples, aspects of the operations of 1405 may be performed by a permit storage component as described with reference to FIGS. 10 through 12.

At 1410, the application server may receive a plaintext data object for a system (e.g., the system containing the application server). The operations of 1410 may be performed according to the methods described herein. In some examples, aspects of the operations of 1410 may be performed by a reception component as described with reference to FIGS. 10 through 12.

At 1415, the application server may identify a data processing permit of the set of data processing permits applicable to the plaintext data object according to an associated data processing activity for the identified data processing permit. The operations of 1415 may be performed according to the methods described herein. In some examples, aspects of the operations of 1415 may be performed by a permit identification component as described with reference to FIGS. 10 through 12.

At 1420, the application server may encrypt the plaintext data object using a cryptographic key to obtain a ciphertext object. The operations of 1420 may be performed according to the methods described herein. In some examples, aspects of the operations of 1420 may be performed by a data encryption component as described with reference to FIGS. 10 through 12.

At 1425, the application server may encrypt the cryptographic key using a permit key including a pointer to the identified data processing permit, where the encrypted cryptographic key is associated with an identifier indicating the permit key. The operations of 1425 may be performed according to the methods described herein. In some examples, aspects of the operations of 1425 may be performed by a key encryption component as described with reference to FIGS. 10 through 12.

At 1430, the application server may receive a delete request for the plaintext data object. The operations of 1430 may be performed according to the methods described herein. In some examples, aspects of the operations of 1430 may be performed by a deletion component as described with reference to FIGS. 10 through 12.

At 1435, the application server may delete the permit key used to encrypt the cryptographic key based on the delete request. The operations of 1435 may be performed according to the methods described herein. In some examples, aspects of the operations of 1435 may be performed by a deletion component as described with reference to FIGS. 10 through 12.

At 1440, the application server may maintain the ciphertext object in the system after deleting the permit key based on deleting the permit key. The data within the ciphertext object may be effectively deleted based on deleting the corresponding permit key. The operations of 1440 may be performed according to the methods described herein. In some examples, aspects of the operations of 1440 may be performed by a deletion component as described with reference to FIGS. 10 through 12.

Figure 15:
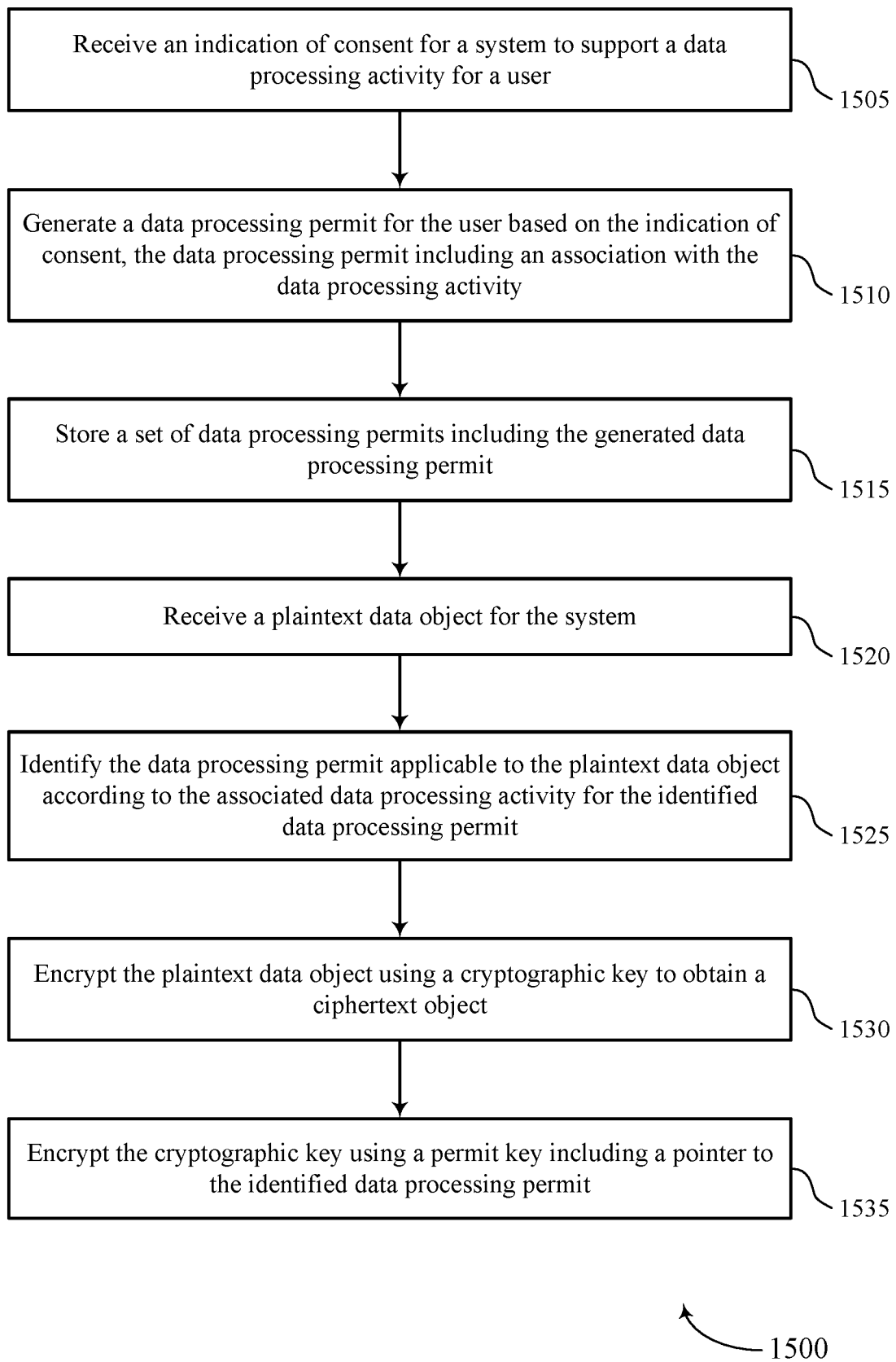

FIG. 15 shows a flowchart illustrating a method 1500 that supports a data processing permits system with keys in accordance with aspects of the present disclosure. The operations of method 1500 may be implemented by an application server or its components as described herein. For example, the operations of method 1500 may be performed by a data processing permits manager as described with reference to FIGS. 10 through 12. In some examples, an application server may execute a set of instructions to control the functional elements of the application server to perform the functions described below. Additionally or alternatively, an application server may perform aspects of the functions described below using special-purpose hardware.

At 1505, the application server may receive, from a user device, an indication of consent for a system to support a data processing activity for a user operating the user device. The operations of 1505 may be performed according to the methods described herein. In some examples, aspects of the operations of 1505 may be performed by a consent component as described with reference to FIGS. 10 through 12.

At 1510, the application server may generate a data processing permit for the user based on the indication of consent, the data processing permit including an association with the data processing activity. The operations of 1510 may be performed according to the methods described herein. In some examples, aspects of the operations of 1510 may be performed by a consent component as described with reference to FIGS. 10 through 12.

At 1515, the application server may store a set of data processing permits, where each data processing permit of the set of data processing permits includes a respective associated data processing activity. The set of data processing permits may include the generated data processing permit. The operations of 1515 may be performed according to the methods described herein. In some examples, aspects of the operations of 1515 may be performed by a permit storage component as described with reference to FIGS. 10 through 12.

At 1520, the application server may receive a plaintext data object for the system. The operations of 1520 may be performed according to the methods described herein. In some examples, aspects of the operations of 1520 may be performed by a reception component as described with reference to FIGS. 10 through 12.

At 1525, the application server may identify that the data processing permit of the set of data processing permits is applicable to the plaintext data object according to the associated data processing activity for the data processing permit. The operations of 1525 may be performed according to the methods described herein. In some examples, aspects of the operations of 1525 may be performed by a permit identification component as described with reference to FIGS. 10 through 12.

At 1530, the application server may encrypt the plaintext data object using a cryptographic key to obtain a ciphertext object. The operations of 1530 may be performed according to the methods described herein. In some examples, aspects of the operations of 1530 may be performed by a data encryption component as described with reference to FIGS. 10 through 12.

At 1535, the application server may encrypt the cryptographic key using a permit key including a pointer to the identified data processing permit, where the encrypted cryptographic key is associated with an identifier indicating the permit key. The operations of 1535 may be performed according to the methods described herein. In some examples, aspects of the operations of 1535 may be performed by a key encryption component as described with reference to FIGS. 10 through 12.

A method for managing data privacy for a system is described. The method may include storing a set of data processing permits, where each data processing permit of the set of data processing permits includes a respective associated data processing activity, receiving a plaintext data object for the system, identifying a data processing permit of the set of data processing permits applicable to the plaintext data object according to an associated data processing activity for the identified data processing permit, encrypting the plaintext data object using a cryptographic key to obtain a ciphertext object, and encrypting the cryptographic key using a permit key including a pointer to the identified data processing permit, where the encrypted cryptographic key is associated with an identifier indicating the permit key.

An apparatus for managing data privacy for a system is described. The apparatus may include a processor, memory coupled with the processor, and instructions stored in the memory. The instructions may be executable by the processor to cause the apparatus to store a set of data processing permits, where each data processing permit of the set of data processing permits includes a respective associated data processing activity, receive a plaintext data object for the system, identify a data processing permit of the set of data processing permits applicable to the plaintext data object according to an associated data processing activity for the identified data processing permit, encrypt the plaintext data object using a cryptographic key to obtain a ciphertext object, and encrypt the cryptographic key using a permit key including a pointer to the identified data processing permit, where the encrypted cryptographic key is associated with an identifier indicating the permit key.

Another apparatus for managing data privacy for a system is described. The apparatus may include means for storing a set of data processing permits, where each data processing permit of the set of data processing permits includes a respective associated data processing activity, receiving a plaintext data object for the system, identifying a data processing permit of the set of data processing permits applicable to the plaintext data object according to an associated data processing activity for the identified data processing permit, encrypting the plaintext data object using a cryptographic key to obtain a ciphertext object, and encrypting the cryptographic key using a permit key including a pointer to the identified data processing permit, where the encrypted cryptographic key is associated with an identifier indicating the permit key.

A non-transitory computer-readable medium storing code for managing data privacy for a system is described. The code may include instructions executable by a processor to store a set of data processing permits, where each data processing permit of the set of data processing permits includes a respective associated data processing activity, receive a plaintext data object for the system, identify a data processing permit of the set of data processing permits applicable to the plaintext data object according to an associated data processing activity for the identified data processing permit, encrypt the plaintext data object using a cryptographic key to obtain a ciphertext object, and encrypt the cryptographic key using a permit key including a pointer to the identified data processing permit, where the encrypted cryptographic key is associated with an identifier indicating the permit key.

Some examples of the method, apparatuses, and non-transitory computer-readable medium described herein may further include operations, features, means, or instructions for receiving a delete request for the plaintext data object, deleting the permit key used to encrypt the cryptographic key based on the delete request, and maintaining the ciphertext object in the system after deleting the permit key based on deleting the permit key.

In some examples of the method, apparatuses, and non-transitory computer-readable medium described herein, the plaintext data object may be inaccessible from the ciphertext object based on deleting the permit key.

Some examples of the method, apparatuses, and non-transitory computer-readable medium described herein may further include operations, features, means, or instructions for receiving a request to perform the associated data processing activity for the identified data processing permit, retrieving the ciphertext object, the encrypted cryptographic key, and the identifier indicating the permit key based on receiving the request, decrypting the encrypted cryptographic key using the permit key to obtain the cryptographic key, decrypting the ciphertext object using the cryptographic key to obtain the plaintext data object, and sending the plaintext data object for processing according to the associated data processing activity based on the request.

Some examples of the method, apparatuses, and non-transitory computer-readable medium described herein may further include operations, features, means, or instructions for determining that the plaintext data object includes a soft identifier for a user and modifying the plaintext data object according to a differential privacy procedure prior to sending the plaintext data object for processing based on the determining.

Some examples of the method, apparatuses, and non-transitory computer-readable medium described herein may further include operations, features, means, or instructions for generating the cryptographic key for the plaintext data object based on receiving the plaintext data object.

In some examples of the method, apparatuses, and non-transitory computer-readable medium described herein, the cryptographic key includes a cryptographic nonce.

Some examples of the method, apparatuses, and non-transitory computer-readable medium described herein may further include operations, features, means, or instructions for transmitting the ciphertext object, the encrypted cryptographic key, and the identifier indicating the permit key to the system for storage.

Some examples of the method, apparatuses, and non-transitory computer-readable medium described herein may further include operations, features, means, or instructions for identifying an additional data processing permit of the set of data processing permits applicable to the plaintext data object according to an additional associated data processing activity for the additional identified data processing permit and encrypting the cryptographic key using an additional permit key including an additional pointer to the additional identified data processing permit, where the encrypted cryptographic key that is encrypted using the additional permit key may be associated with an identifier indicating the additional permit key.

Some examples of the method, apparatuses, and non-transitory computer-readable medium described herein may further include operations, features, means, or instructions for receiving an additional plaintext data object for the system, identifying that the data processing permit of the set of data processing permits may be further applicable to the additional plaintext data object according to the associated data processing activity for the identified data processing permit, encrypting the additional plaintext data object using an additional cryptographic key to obtain an additional ciphertext object, and encrypting the additional cryptographic key using the permit key including the pointer to the identified data processing permit, where the additional encrypted cryptographic key may be associated with an additional identifier indicating the permit key.

Some examples of the method, apparatuses, and non-transitory computer-readable medium described herein may further include operations, features, means, or instructions for receiving, from a user device, an indication of consent for the system to support the associated data processing activity for a user operating the user device and generating the identified data processing permit for the user based on the indication of consent, the identified data processing permit including the associated data processing activity.

Some examples of the method, apparatuses, and non-transitory computer-readable medium described herein may further include operations, features, means, or instructions for determining a consent contract for the user and transmitting, for display at the user device, the consent contract for the user, where the indication of consent may be received based on the consent contract.

Some examples of the method, apparatuses, and non-transitory computer-readable medium described herein may further include operations, features, means, or instructions for determining that the plaintext data object includes a hard identifier for a user and tokenizing the plaintext data object prior to encrypting the plaintext data object based on the determining.

Some examples of the method, apparatuses, and non-transitory computer-readable medium described herein may further include operations, features, means, or instructions for generating the set of data processing permits based on a data catalog for the system.

Some examples of the method, apparatuses, and non-transitory computer-readable medium described herein may further include operations, features, means, or instructions for receiving an update to a legitimizing reason for storing the plaintext data object, storing an updated data processing permit based on the update to the legitimizing reason for storing the plaintext data object, and updating the pointer of the permit key such that the pointer is to the updated data processing permit and not to the identified data processing permit based on the update to the legitimizing reason for storing the plaintext data object and storing the updated data processing permit.

In some examples of the method, apparatuses, and non-transitory computer-readable medium described herein, the plaintext data object includes a set of key-value pairs. In some examples of the method, apparatuses, and non-transitory computer-readable medium described herein, the set of data processing permits corresponds to a set of data privacy regulations, a set of data processing activities, a set of device identities, a set of users, or a combination thereof, each user of the set of users corresponds to multiple data processing permits of the set of data processing permits, and each data processing permit of the set of data processing permits corresponds to a respective user of the set of users.

Some examples of the method, apparatuses, and non-transitory computer-readable medium described herein may further include operations, features, means, or instructions for maintaining an audit log for the system.

It should be noted that the methods described above describe possible implementations, and that the operations and the steps may be rearranged or otherwise modified and that other implementations are possible. Furthermore, aspects from two or more of the methods may be combined.

The description set forth herein, in connection with the appended drawings, describes example configurations and does not represent all the examples that may be implemented or that are within the scope of the claims. The term "exemplary" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, well-known structures and devices are shown in block diagram form in order to avoid obscuring the concepts of the described examples.

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label.

Information and signals described herein may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The various illustrative blocks and modules described in connection with the disclosure herein may be implemented or performed with a general-purpose processor, a DSP, an ASIC, an FPGA or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described above can be implemented using software executed by a processor, hardware, firmware, hardwiring, or combinations of any of these. Features implementing functions may also be physically located at various positions, including being distributed such that portions of functions are implemented at different physical locations. Also, as used herein, including in the claims, "or" as used in a list of items (for example, a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an exemplary step that is described as "based on condition A" may be based on both a condition A and a condition B without departing from the scope of the present disclosure. In other words, as used herein, the phrase "based on" shall be construed in the same manner as the phrase "based at least in part on."

Computer-readable media includes both non-transitory computer storage media and communication media including any medium that facilitates transfer of a computer program from one place to another. A non-transitory storage medium may be any available medium that can be accessed by a general purpose or special purpose computer. By way of example, and not limitation, non-transitory computer-readable media can comprise RAM, ROM, electrically erasable programmable read only memory (EEPROM), compact disk (CD) ROM or other optical disk storage, magnetic disk storage or other magnetic storage devices, or any other non-transitory medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

The description herein is provided to enable a person skilled in the art to make or use the disclosure. Various modifications to the disclosure will be readily apparent to those skilled in the art, and the generic principles defined herein may be applied to other variations without departing from the scope of the disclosure. Thus, the disclosure is not limited to the examples and designs described herein, but is to be accorded the broadest scope consistent with the principles and novel features disclosed herein.

What is claimed is:

1. A method for managing data privacy for a system comprising a processor, memory coupled with the processor, and instructions stored in the memory, that when executed by the processor, cause the system to perform the method, comprising:

storing a set of data processing permits, wherein each data processing permit of the set of data processing permits comprises a respective associated data processing activity;

receiving a plaintext data object for the system;

identifying a data processing permit of the set of data processing permits applicable to the plaintext data object and permitting the system to store the plaintext data object to support the associated data processing activity for the identified data processing permit;

determining to encrypt and store the plaintext data object based at least in part on the identifying the data processing permit applicable to the plaintext data object;

encrypting, based at least in part on the determining to encrypt and store the plaintext data object, the plaintext data object using a cryptographic key to obtain a ciphertext object;

encrypting the cryptographic key using a permit key comprising a pointer pointing to the identified data processing permit, wherein the encrypted cryptographic key is associated with an identifier indicating the permit key;

receiving a request to perform the associated data processing activity;

identifying that the identified data processing permit supports the request based at least in part on the associated data processing activity for the identified data processing permit;

retrieving the ciphertext object, the encrypted cryptographic key, and the identifier indicating the permit key based at least in part on the receiving the request and the identifying that the identified data processing permit supports the request;

identifying the permit key that permits access to the plaintext data object based at least in part on the identifier indicating the permit key and the identifying that the identified data processing permit supports the request;

decrypting the encrypted cryptographic key using the permit key to obtain the cryptographic key based at least in part on the identifying the permit key that permits access to the plaintext data object; and decrypting the ciphertext object using the cryptographic key to obtain the plaintext data object.

2. The method of claim 1, further comprising:
receiving a delete request for the plaintext data object;
deleting the permit key used to encrypt the cryptographic key based at least in part on the delete request; and
maintaining the ciphertext object in the system after the deleting the permit key based at least in part on the deleting the permit key.

3. The method of claim 2, wherein the plaintext data object is inaccessible from the ciphertext object based at least in part on the deleting the permit key.

4. The method of claim 1, further comprising:
sending the plaintext data object for processing according to the associated data processing activity in response to the request.

5. The method of claim 4, further comprising:
determining that the plaintext data object comprises a soft identifier for a user; and
modifying the plaintext data object according to a differential privacy procedure prior to the sending the plaintext data object for processing based at least in part on the determining that the plaintext data object comprises the soft identifier for the user.

6. The method of claim 1, further comprising:
generating the cryptographic key for the plaintext data object based at least in part on the receiving the plaintext data object.

7. The method of claim 6, wherein the cryptographic key comprises a cryptographic nonce.

8. The method of claim 1, further comprising:
transmitting the ciphertext object, the encrypted cryptographic key, and the identifier indicating the permit key to the system for storage.

9. The method of claim 1, further comprising:
identifying an additional data processing permit of the set of data processing permits applicable to the plaintext data object and permitting the system to store the plaintext data object to support an additional associated data processing activity for the additional identified data processing permit; and encrypting the cryptographic key using an additional permit key comprising an additional pointer pointing to the additional identified data processing permit, wherein the encrypted cryptographic key that is encrypted using the additional permit key is associated with an identifier indicating the additional permit key.

10. The method of claim 1, further comprising:
receiving an additional plaintext data object for the system;
identifying that the data processing permit of the set of data processing permits is further applicable to the additional plaintext data object and further permits the system to store the additional plaintext data object to support the associated data processing activity for the identified data processing permit;
determining to encrypt and store the additional plaintext data object based at least in part on the identifying that the data processing permit is further applicable to the additional plaintext data object;
encrypting, based at least in part on the determining to encrypt and store the additional plaintext data object, the additional plaintext data object using an additional cryptographic key to obtain an additional ciphertext object; and
encrypting the additional cryptographic key using the permit key comprising the pointer pointing to the identified data processing permit, wherein the additional encrypted cryptographic key is associated with an additional identifier indicating the permit key.

11. The method of claim 1, further comprising:
receiving, from a user device, an indication of consent for the system to support the associated data processing activity for a user operating the user device; and
generating the identified data processing permit for the user based at least in part on the indication of consent, the identified data processing permit comprising the associated data processing activity.

12. The method of claim 11, further comprising:
determining a consent contract for the user; and
transmitting, for display at the user device, the consent contract for the user, wherein the indication of consent is received based at least in part on the consent contract.

13. The method of claim 1, further comprising:
determining that the plaintext data object comprises a hard identifier for a user; and
tokenizing the plaintext data object prior to the encrypting the plaintext data object based at least in part on the determining that the plaintext data object comprises the hard identifier for the user.

14. The method of claim 1, further comprising:
generating the set of data processing permits based at least in part on a data catalog for the system.

15. The method of claim 1, further comprising:
receiving an update to a legitimizing reason for storing the plaintext data object;
storing an updated data processing permit based at least in part on the update to the legitimizing reason for storing the plaintext data object; and
updating the pointer of the permit key, wherein the updated pointer points to the updated data processing permit and does not point to the identified data processing permit based at least in part on the storing the updated data processing permit.

16. The method of claim 1, wherein the plaintext data object comprises a set of key-value pairs.

17. The method of claim 1, wherein:
the identified data processing permit of the set of data processing permits defines a legitimizing reason for the system to store a specific set of data for a specific usage, the specific usage defined by the associated data processing activity for the identified data processing permit, and wherein the identified data processing permit is applicable to the plaintext data object based at least in part on the specific set of data comprising the plaintext data object;
the set of data processing permits corresponds to a plurality of data privacy regulations, a plurality of data processing activities, a plurality of device identities, a plurality of users, or a combination thereof;
each user of the plurality of users corresponds to a plurality of data processing permits of the set of data processing permits; and
each data processing permit of the set of data processing permits corresponds to a respective user of the plurality of users.

18. The method of claim 1, further comprising:
maintaining an audit log for the system.

19. An apparatus for managing data privacy for a system, comprising:
a processor;
memory coupled with the processor; and
instructions stored in the memory, that when executed by the processor, cause the apparatus to:
store a set of data processing permits, wherein each data processing permit of the set of data processing permits comprises a respective associated data processing activity;
receive a plaintext data object for the system;
identify a data processing permit of the set of data processing permits applicable to the plaintext data object and permitting the system to store the plaintext data object to support the associated data processing activity for the identified data processing permit;
determine to encrypt and store the plaintext data object based at least in part on the identifying the data processing permit applicable to the plaintext data object;
encrypt, based at least in part on the determining to encrypt and store the plaintext data object, the plaintext data object using a cryptographic key to obtain a ciphertext object;
encrypt the cryptographic key using a permit key comprising a pointer pointing to the identified data processing permit, wherein the encrypted cryptographic key is associated with an identifier indicating the permit key;
receive a request to perform the associated data processing activity;
identify that the identified data processing permit supports the request based at least in part on the associated data processing activity for the identified data processing permit;
retrieve the ciphertext object, the encrypted cryptographic key, and the identifier indicating the permit key based at least in part on the receiving the request and the identifying that the identified data processing permit supports the request;
identify the permit key that permits access to the plaintext data object based at least in part on the identifier indicating the permit key and the identifying that the identified data processing permit supports the request;
decrypt the encrypted cryptographic key using the permit key to obtain the cryptographic key based at least in part on the identifying the permit key that permits access to the plaintext data object; and
decrypt the ciphertext object using the cryptographic key to obtain the plaintext data object.

20. A non-transitory computer-readable medium storing code for managing data privacy for a system, the code comprising instructions, that when executed by a processor:
store a set of data processing permits, wherein each data processing permit of the set of data processing permits comprises a respective associated data processing activity;
receive a plaintext data object for the system;
identify a data processing permit of the set of data processing permits applicable to the plaintext data object and permitting the system to store the plaintext data object to support the associated data processing activity for the identified data processing permit;
determine to encrypt and store the plaintext data object based at least in part on the identifying the data processing permit applicable to the plaintext data object;
encrypt, based at least in part on the determining to encrypt and store the plaintext data object, the plaintext data object using a cryptographic key to obtain a ciphertext object;
encrypt the cryptographic key using a permit key comprising a pointer pointing to the identified data processing permit, wherein the encrypted cryptographic key is associated with an identifier indicating the permit key;
receive a request to perform the associated data processing activity;
identify that the identified data processing permit supports the request based at least in part on the associated data processing activity for the identified data processing permit;
retrieve the ciphertext object, the encrypted cryptographic key, and the identifier indicating the permit key based at least in part on the receiving the request and the identifying that the identified data processing permit supports the request;
identify the permit key that permits access to the plaintext data object based at least in part on the identifier indicating the permit key and the identifying that the identified data processing permit supports the request;
decrypt the encrypted cryptographic key using the permit key to obtain the cryptographic key based at least in part on the identifying the permit key that permits access to the plaintext data object; and
decrypt the ciphertext object using the cryptographic key to obtain the plaintext data object.

* * * * *